(12) United States Patent
Pefkianakis et al.

(10) Patent No.: US 11,895,532 B2
(45) Date of Patent: Feb. 6, 2024

(54) DETECTING CELLULAR NETWORK BOTTLENECKS USING DATA ALLOCATION PATTERNS

(71) Applicant: Apple Inc., Cupertino, CA (US)

(72) Inventors: Ioannis Pefkianakis, San Jose, CA (US); Madhusudan Chaudhary, Campbell, CA (US); Muthukumaran Dhanapal, Dublin, CA (US); Lakshmi N. Kavuri, Cupertino, CA (US); Thanigaivelu Elangovan, Santa Clara, CA (US); Ajay Singh, Cupertino, CA (US); Deepankar Bhattacharjee, Milpitas, CA (US); Gaurav Pathak, Hyderabad (IN); Carola Faronius, Stockholm (SE); Franco Travostino, San Jose, CA (US); Raghuveer Mallikarjunan, Cupertino, CA (US); Harshit Chuttani, Campbell, CA (US); Sreevalsan Vallath, Dublin, CA (US); Rajesh Ambati, Los Altos Hills, CA (US); Jia Tang, San Jose, CA (US); Ishwinder Singh, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 207 days.

(21) Appl. No.: 17/567,743

(22) Filed: Jan. 3, 2022

(65) Prior Publication Data

US 2022/0217577 A1    Jul. 7, 2022

(30) Foreign Application Priority Data

Jan. 5, 2021 (IN) .............................. 202141000454

(51) Int. Cl.
*H04W 28/02* (2009.01)
*H04W 36/22* (2009.01)
(Continued)

(52) U.S. Cl.
CPC ....... *H04W 28/0284* (2013.01); *H04W 24/08* (2013.01); *H04W 36/14* (2013.01); *H04W 36/22* (2013.01)

(58) Field of Classification Search
CPC . H04W 28/0284; H04W 24/08; H04W 36/14; H04W 36/22; H04W 36/36
See application file for complete search history.

(56) References Cited

U.S. PATENT DOCUMENTS 7,171,160 B2   1/2007   Chuah et al.
9,544,812 B2   1/2017   Grinshpun et al.
(Continued)

OTHER PUBLICATIONS

Examination Report for IN Patent Application No. 202141000454; dated Sep. 4, 2023.
(Continued)

*Primary Examiner* — Hassan Kizou
*Assistant Examiner* — Hector Reyes
(74) *Attorney, Agent, or Firm* — Kowert, Hood, Munyon, Rankin & Goetzel, P.C.

(57) ABSTRACT

A user equipment (UE) passively determines the presence of a cellular network bottleneck in a downlink channel and may take appropriate actions to mitigate the bottleneck. The UE may analyze the transport block size (TBS) of slots of received downlink traffic and assign states the to various slots based on this analysis. Based on these assigned states, the UE may identify a burst of network traffic from network traffic received from the cellular network, and the UE may also determine the burst duration as well as a busy estimation. The UE may determine that the cellular network is experiencing a bottleneck based at least in part on the burst duration and the busy estimation.

20 Claims, 22 Drawing Sheets

(51) Int. Cl.
    *H04W 36/14*    (2009.01)
    *H04W 24/08*    (2009.01)

(56) References Cited

U.S. PATENT DOCUMENTS

| | | |
|---|---|---|
| 10,165,576 B2 | 12/2018 | Sen et al. |
| 2002/0169880 A1 | 11/2002 | Loguinov |
| 2018/0270711 A1* | 9/2018 | Moon ................ H04W 28/0236 |
| 2018/0331705 A1* | 11/2018 | Ghani ................... H04L 1/1812 |
| 2019/0150197 A1 | 5/2019 | Sheu et al. |
| 2019/0174349 A1 | 6/2019 | Sun et al. |
| 2020/0029245 A1 | 1/2020 | Khoryaev et al. |
| 2020/0100263 A1 | 3/2020 | Gupta et al. |
| 2020/0229041 A1 | 7/2020 | Nguyen et al. |
| 2020/0336263 A1 | 10/2020 | Halepovic |
| 2022/0369151 A1* | 11/2022 | Manja Ppallan ....... H04L 47/27 |
| 2023/0041484 A1* | 2/2023 | Liu ....................... H04W 24/10 |

OTHER PUBLICATIONS

Balasingam et al. "Detecting if LTD is the bottleneck with Burst-Tracker"; the 25th Annual International Conference on Mobile Computing and Networking; May 8, 2019.

Baranasuriya et al. "QProbe: Locating the bottleneck in cellular communication"; Proceeding of the 11th ACM Conference on Emerging Networking Experiments and Technologies; Dec. 1, 2015.

Michelinakis et al., "Lightweight Mobile Bandwidth Availability Measurement," ISBN 978-3-901882-68-5, IEEE 2015, IFIP, available at http://eprints.networks.imdea.org/1035/1/PID3634195.pdf, nine pages.

* cited by examiner

DETECTING CELLULAR NETWORK BOTTLENECKS USING DATA ALLOCATION PATTERNS

PRIORITY DATA

This application is the National Stage of Indian Patent Application No. 202141000454, titled "Detecting Cellular Network Bottlenecks Through Data Allocation Patterns", filed Jan. 5, 2021, which is hereby incorporated by reference in its entirety as though fully and completely set forth herein.

FIELD

The present application relates to wireless networks for user equipment (UE) devices, including a system and method for passively determining bottlenecks in a cellular network.

BACKGROUND

Wireless communication systems have rapidly grown in usage. In recent years, wireless devices such as smart phones and tablet computers have become increasingly sophisticated. Mobile devices (i.e., user equipment devices or UEs) support telephone calls as well as provide access to the Internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc. Networks associated with these standards are known as radio access networks (RANs).

SUMMARY

Aspects are presented herein of a system and method for operation of a user equipment (UE) to determine the existence of a cellular network bottleneck in a downlink channel, and an apparatus for use in a UE for determining the same. The UE may comprise at least one antenna, a radio operably coupled to the at least one antenna for communicating with a cellular network, a memory coupled to the radio and a processor operably coupled to the memory and the radio.

The UE may receive network traffic from the cellular network during a series of slots or transmission time intervals. The UE may analyze the transport block size (TBS) of each of the slots and compare them to a maximum TBS ($TBS_{max}$). The UE may then use this analysis to assign states to various ones of the slots, where the states may be one or more of Active, Busy, Last-Active and Underflow (Idle). In other words, the UE may identify states of each of respective ones of the transmission slots based at least in part on a transport block size of each of the respective slots.

The UE may then determine characteristics of the network traffic burst in the received network traffic based on the identified states of the transmission slots. The determined characteristics may comprise a duration of the burst of network traffic and/or a busy estimation of the burst of network. The UE may determine a duration of the burst by identifying a first active and last active transmission slot in the burst. The UE may determine a busy estimation based on a relative number of active and/or busy states in the burst, e.g., based at least in part on a percentage of slots in the burst of network traffic that are determined to be active (or busy). The UE may determine these characteristics as an average over a plurality of bursts to smooth out any anomalies.

The UE may then determine whether the cellular network is experiencing a bottleneck based at least in part on these characteristics. In response to determining the presence or absence of a bottleneck, the UE may take appropriate action, such as switching to a different RAT, switching to a different SIM, and/or various energy-saving operations.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present disclosure can be obtained when the following detailed description of the aspects is considered in conjunction with the following drawings.

Figure 1:
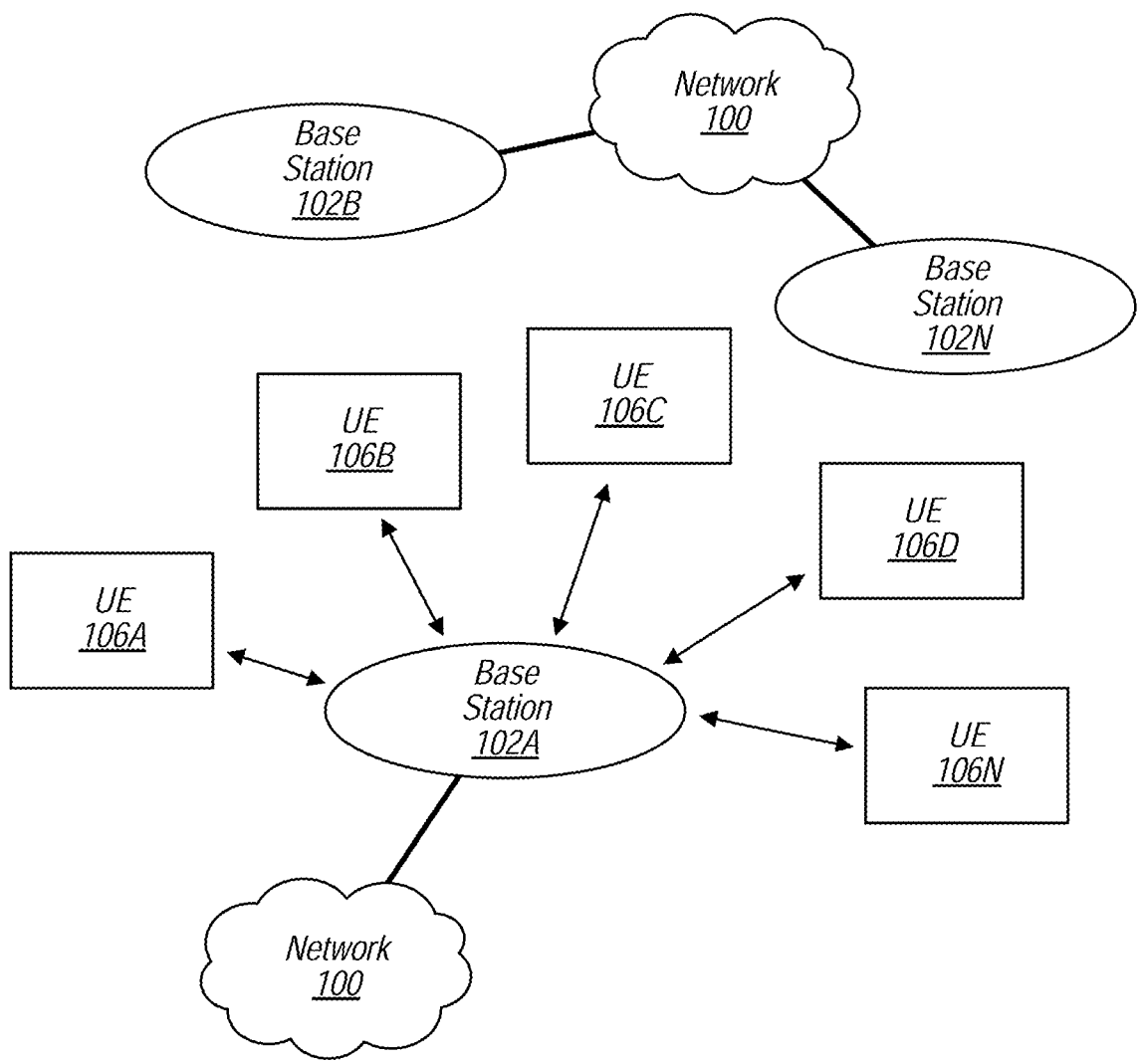
FIG. 1 illustrates an example (and simplified) wireless communication system according to some aspects.

While the disclosure is susceptible to various modifications and alternative forms, specific aspects thereof are shown by way of example in the drawings and are herein described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION

Incorporation by Reference

U.S. patent application Ser. No. 16/888,555 titled "Detecting Cellular Network Bottlenecks Through Analysis of Resource Allocation Patterns" and filed on May 29, 2020 is hereby incorporated by referenced in its entirety as though fully and completely set forth herein.

Acronyms

Various acronyms are used throughout the present disclosure. Definitions of the most prominently used acronyms that may appear throughout the present disclosure are provided below:

UE: User Equipment
RF: Radio Frequency
BS: Base Station
NW: Network
DL: Downlink
UL: Uplink
GSM: Global System for Mobile Communication
UMTS: Universal Mobile Telecommunication System
LTE: Long Term Evolution
NR: New Radio
TBS: Transport Block Size
TTI: Transmission Time Interval
MCS: Modulation and Coding Scheme
MIMO: Multiple Input/Multiple Output
TX: Transmission/Transmit
RX: Reception/Receive
RAT: Radio Access Technology
RAN: Radio Access Network
PUSCH: Physical Uplink Shared Channel
PDCCH: Physical Downlink Control Channel
RRC: Radio Resource Control Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™ Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, unmanned aerial vehicles (UAVs), unmanned aerial controllers (UACs), vehicles, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Bottleneck—A network bottleneck is a point where the application data rate cannot be accommodated by the wireless network. A bottleneck may occur when the network has so many requests from a plurality of UEs that the network is unable to provide one or more of the UEs with the attention they need or desire. A bottleneck may also occur when the performance of the wireless link is poor due to low signal strength or interference. A bottleneck may also occur when a specific application servicing a UE demands more bandwidth than is available on the network. As one example, a network "bottleneck" may be a point of traffic congestion on the network.

Burst—a continuous transfer of data, that may or may not have an interruption, from one device to another.

Transmission Time Interval (TTI)—The term "transmission time interval" has the full extent of its ordinary meaning, and at least includes a time unit for the base station (BS) to schedule uplink ILL) and downlink (DL) data transmissions. The term "slot" is used to refer to a TTI.

Radio Access Network (RAN)—A radio access network is part of a telecommunications system that connects individual devices to other parts of a network through radio connections. A RA resides between user equipment, such as a mobile phone, a computer or any remotely controlled machine, and provides the connection with its core network. Examples of radio access networks include Bluetooth, GSM, UMTS, 4G LIE and 5G NR network connections.

Radio Access Technology (RAT)—A radio access technology is the underlying physical connection method for a radio access network. Many modern mobile phones support several RATs in one device such as Bluetooth, and GSM, UMTS, 4G LIE or 5G NR.

Uplink (UL)—in cellular communications an uplink is a transmission path from a User Equipment (UE) to a base station (BS).

Downlink (DL)—in cellular communications, a downlink is a transmission path from a base station (BS) to a User Equipment (UE).

Contention—a condition that occurs when two or more mobile devices or LTEs are contending for the same network resources.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Data flow in a network is subject to the bandwidth of the various resources and devices on the system supported by the network. When a high volume of data is attempting to flow through the network and there is insufficient bandwidth support, bottlenecks and network congestion may occur. The continued increase in the popularity of mobile data applications has led to an increase in both the number of UEs using a cellular network and the overall consumption of mobile data on a cellular network. At times, these increases have led to bottlenecks.

A network bottleneck refers to a condition in which data flow (e.g., transmission of data from a base station to a UE) is limited by insufficient computer or network resources and/or poor wireless link performance (e.g., poor signal strength or interference). The term "network congestion" may also be used to refer to a bottleneck. Bottlenecks may result in highly undesirable conditions such as slow communication speeds, poor application performance, application failures, and limitations to user efficiency and productivity on a network. As a result, a number of approaches have been implemented to determine and manage network bottlenecks.

The determination of radio access technology (RAT) bottlenecks at the UE is a very important, yet challenging problem, especially in the downlink (from a base station to a UE). If a UE can determine that a certain RAT has a bottleneck in the downlink, the UE may take steps to improve mobile application performance.

Existing approaches for identifying bottlenecks in a downlink (such as SpeedTest) rely on measuring throughput. However, since low downlink throughput can be attributed to multiple factors, measuring cellular interface downlink throughput is not sufficient to identify bottlenecks. For example, low downlink throughput may be attributed to low offered application data rates, a condition that is not created by a RAT bottleneck.

Another method of bottleneck determination utilizes active measurements for throughput estimation. Approaches relying on active measurements are limited as they cannot determine whether a bottleneck should be attributed to the radio access network (RAN) or to the core network. Also, approaches relying on active measurements impose additional overhead on the RAT, creating even more traffic on the downlink.

Figure 2:
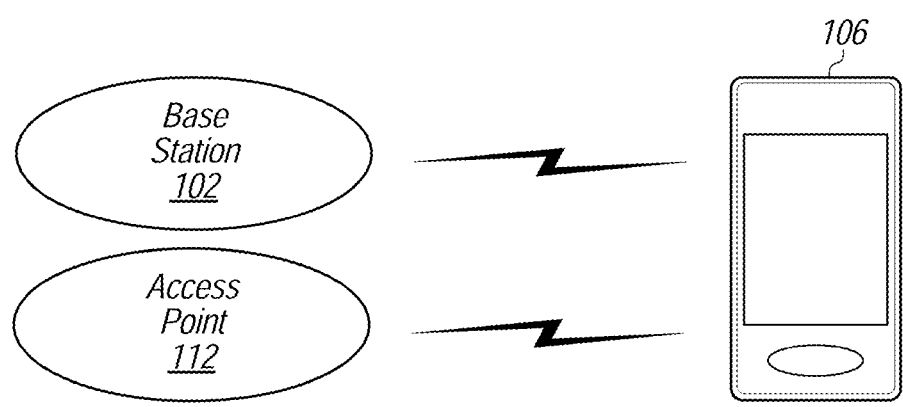
FIG. 2 illustrates an example of a base station (base station) and an access point in communication with a user equipment (UE) device according to some aspects.

FIGS. 1 and 2—Example Communication System

FIG. 1 illustrates a simplified example wireless communication system in which aspects of this disclosure may be implemented, according to some aspects. It is noted that the system of FIG. 1 is merely one example of a possible system, and aspects may be implemented in any of various systems, as desired.

As shown, the example wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices. The UE devices are examples of wireless devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'.

The communication area (or coverage area) of the base station may be referred to as a "cell." The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. In particular, the cellular base station 102A may provide UEs 106 with various telecommunication capabilities, such as voice, SMS and/or data services.

As also used herein, from the perspective of UEs, a base station may sometimes be considered as representing the network as far as uplink and downlink communications of the UE are concerned. Thus, a UE communicating with one or more base stations in the network may also be interpreted as the UE communicating with the network.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some aspects, base station 102A may be a next generation base station, e.g., a 5G New Radio (5G NR) base station, or "gNB". In some aspects, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment (UE) 106 (e.g., one of the devices 106A through 106N) in communication with a base station 102 and an access point 112, according to some aspects. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device as defined above.

The UE 106 may include a processor (processing element) that is configured to execute program instructions stored in memory. The UE 106 may perform any of the operations described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the aspects described herein, or any portion of any of the aspects described herein.

The UE 106 may include one or more antennas for communicating using one or more wireless communication protocols or technologies. In some aspects, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some aspects, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

In a similar manner, the base station 102 may include a processor (processing element) that is configured to execute program instructions stored in memory. The base station 102 may perform any of the operations described herein by executing such stored instructions. Alternatively, or in addition, the base station 102 may include a programmable hardware element such as an FPGA (field-programmable gate array), an integrated circuit, and/or any of various other possible hardware components that are configured to perform (e.g., individually or in combination) any of the aspects described herein, or any portion of any of the aspects described herein.

Figure 3:
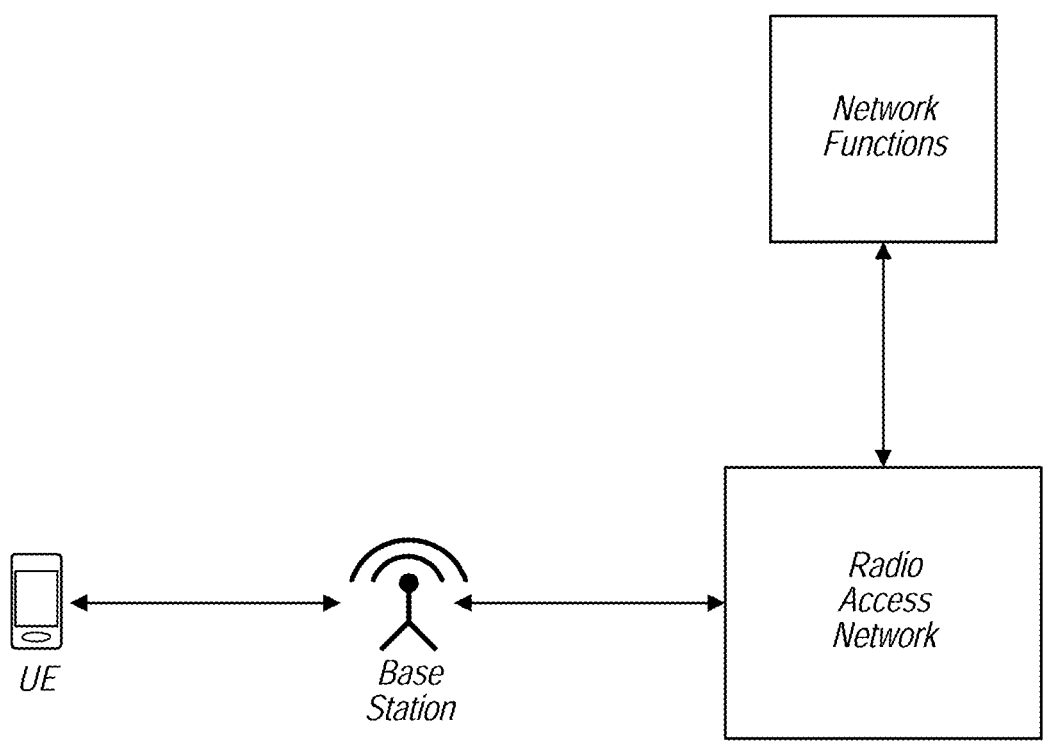
FIG. 3 is a block diagram of a cellular network system, according to some aspects.

FIG. 3—Example Cellular Network

FIG. 3 is a block diagram illustrating an example cellular network, according to some aspects. As shown, the UE communicates in a wireless fashion with a base station, which may as one example be referred to as gNB. The base station in turn communicates to a cellular network.

FIG. 3 illustrates a simplified view of a cellular network, showing various elements which may be relevant to operations described herein. As shown, the base station may couple to a Radio Access Network (RAN). The RAN may in turn couple to various network elements or network functions, e.g., one or more computer systems which implement various network functions. For example, the Radio Access Network may couple to a User Plane Function (UPF) which in turn may be coupled to various additional network functions.

Typically, Network Functions may be implemented as software executing on a computer system, such as a server, e.g., a cloud server. Network functions which may be present in the cellular network system may include functions such as an Access and Mobility Management Function (AMF), a Policy Control Function (PCF), a Network Data Analytics Function (NWDAF), an Application Function (AF), a Network Slice Selection Function (NSSF), and a UE radio Capability Management Function (UCMF), among numerous possible others.

Figure 4:
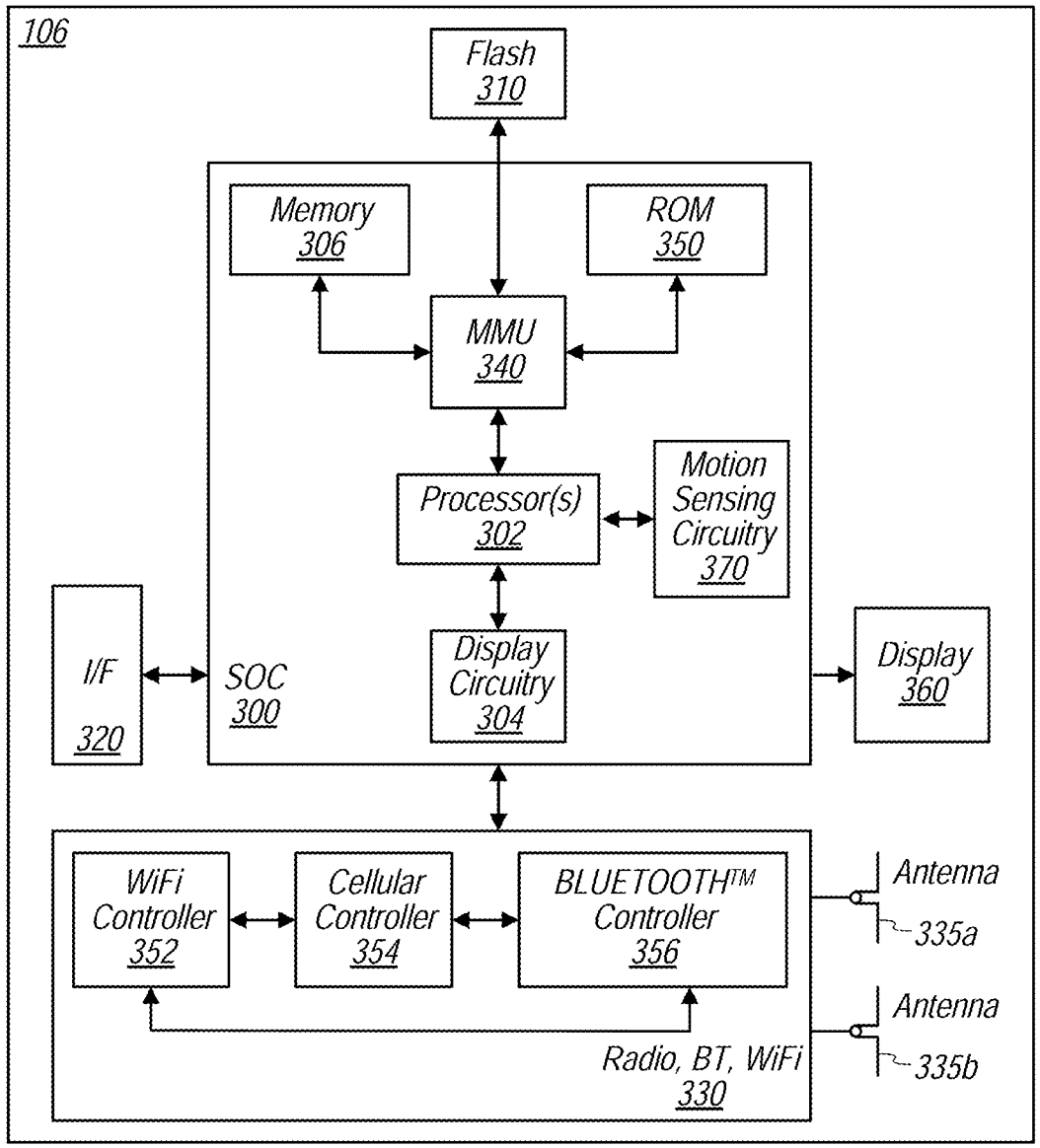
FIG. 4 illustrates an example block diagram of a UE, according to one aspect.

FIG. 4—Block Diagram of an Example UE Device

FIG. 4 illustrates a block diagram of an example UE 106, according to some aspects. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, Flash memory 310) and/or to other circuits or devices, such as the display circuitry 304, radio 330, connector I/F 320, and/or display 360. The MMU 340 may be configured to perform memory protection and page table translation or set up. In some aspects, the MMU 340 may be included as a portion of the processor(s) 302.

As shown, the SOC 300 may be coupled to various other circuits of the UE 106. For example, the UE 106 may include various types of memory (e.g., including Flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g., 335a), and possibly multiple antennas (e.g., illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some aspects.

In some aspects, radio 330 may include separate controllers dedicated to controlling communications for various respective RAT standards. For example, as shown in FIG. 4, radio 330 may include a Wi-Fi controller 352, a cellular controller (e.g. LTE and/or LTE-A controller) 354, and BLUETOOTH™ controller 356, and in at least some aspects, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other aspects have fewer or more similar controllers for various different RATs that may be implemented in UE device 106.

Figure 5:
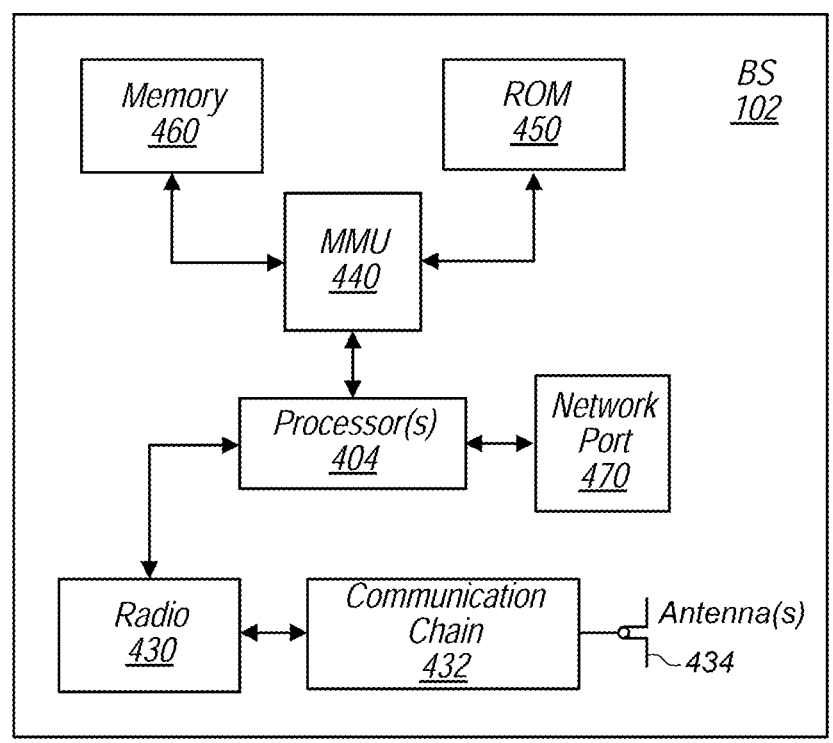
FIG. 5 illustrates an example block diagram of a base station, according to one aspect.

FIG. 5—Block Diagram of an Example Base Station

FIG. 5 illustrates a block diagram of an example base station 102, according to some aspects. It is noted that the base station of FIG. 5 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard.

Bottleneck Determination

A network bottleneck may be characterized as a point of traffic congestion on the network. A network may have so many requests from various UEs that the network is unable to provide the one or more UEs with the attention they need or desire. Alternatively, or in addition, certain applications servicing one or more UEs may utilize such a large amount of bandwidth that the network is not able to accommodate these bandwidth demands. In such a situation, a bottleneck may occur in a downlink between a base station and a UE. The bottleneck may result in slow communication speeds, poor application performance and may limit user efficiency and productivity on a network.

If a UE can determine the presence of a bottleneck in a downlink (from a base station to a UE), it may have the opportunity to take action to mitigate the effects to the UE. For example, upon determination of a bottleneck in a downlink, a UE may choose to adjust the execution of one or more applications, alert the network and/or the user, or switch to another RAT or SIM, etc.

Described herein is system and method for identifying cellular network bottlenecks by leveraging data allocation patterns, including base station scheduling allocation patterns. The UE may assess data allocation patterns by analyzing the transport block size (TBS) of each of various received slots. The data allocation patterns may be used to first identify traffic bursts and then to analyze these traffic bursts to determine cellular network bottlenecks. In other words, aspects described herein may operate to analyze data allocations to the UE in received slots, also referred to as received transmission time intervals (TTIs), to determine (or attempt to assess) an extent to which the cellular network is busy, and thus whether a bottleneck has occurred.

Figure 6:
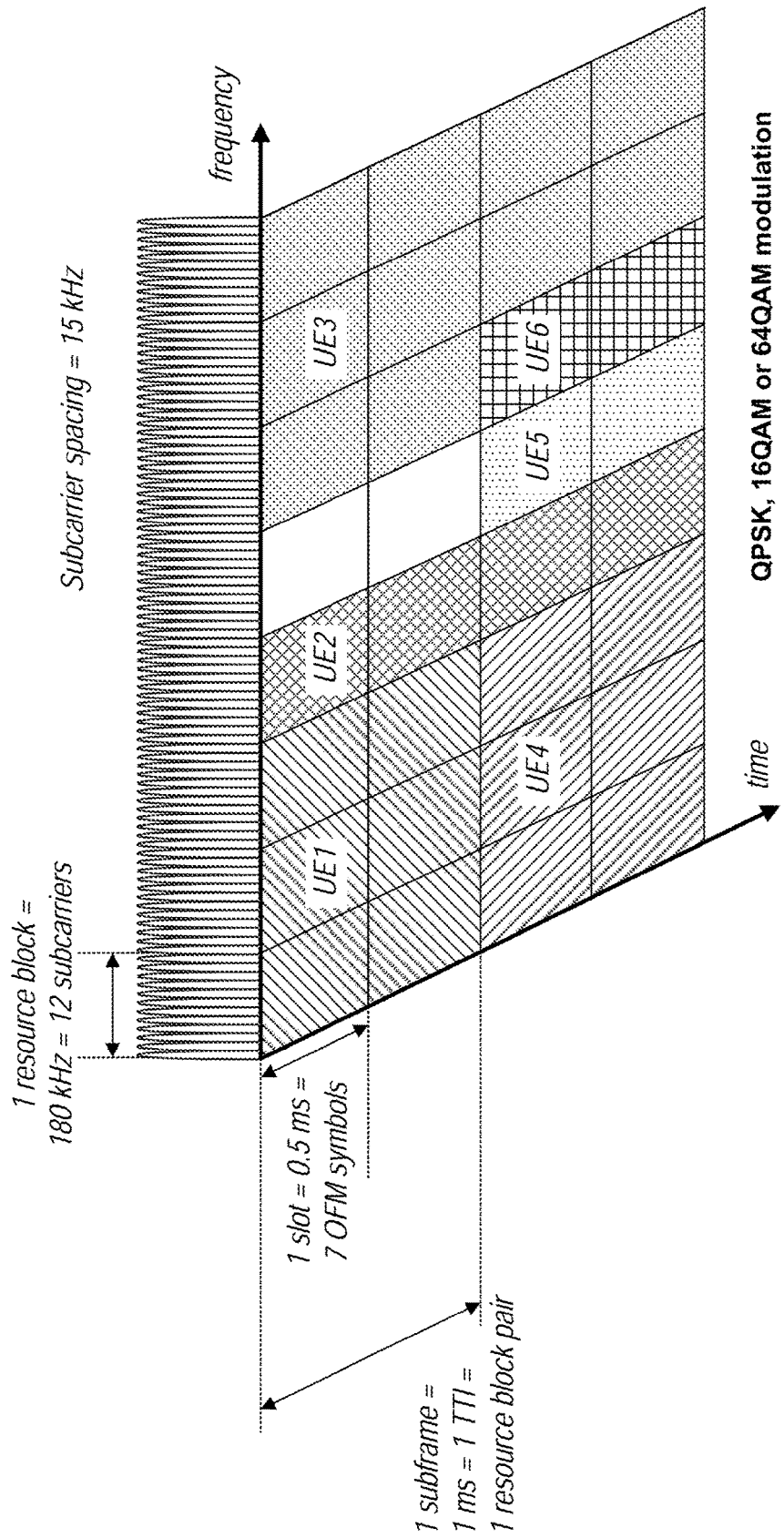
FIG. 6 illustrates an example of downlink data transmission in LTE.

FIG. 6—Downlink Data Transmission

FIG. 6 illustrates downlink data transmission using LTE as an example. A resource block (RB) is the smallest unit of resources that can be allocated to a UE by a base station. A cellular base station may use a centralized proportional fair scheduler which assigns RBs to UEs at each scheduling interval. A scheduling interval, in this context, may also be known as a slot or a transmission time interval (TTI). For example, in LTE, an RB is specified in time (7 OFDM symbols) and in frequency (12 subcarriers) dimensions and a slot (TTI) is 1 ms. For a 20 MHz channel, there are 100 RBs in one slot (TTI).

A burst has been traditionally defined as a continuous transfer of data that ideally is without interruption (but which may have some interruption) from one device to another. A base station prefers to send data to each UE in bursts, i.e., to assign all of the RBs in one slot to one UE. There are a number of reasons for this behavior. For example, bursting saves spectrum by reducing control channel overhead. Also, bursting improves a UE's battery life by increasing the time a UE's radio can enter low-power mode. Hence, in each slot or TTI, a base station will assign a small fraction of the total RBs to a target UE only if there is no more buffered data for the target UE, implying the end of a burst. Therefore, aspects described herein may enable a UE to determine characteristics of a burst through the observation of a base station's data allocation pattern (TBS) to the UE.

As used herein, the term "burst" is used to refer to traditional bursts as defined above (a continuous transfer of largely uninterrupted data), as well as partially continuous transfers of data which in fact were interrupted by the network due to a bottleneck, a measurement gap, or some other reason. In other words, the term "burst" as used herein refers to a group of data that is received by the UE in two or more consecutive transfer intervals, which may or may not have been in fact interrupted with empty slots or TTIs due to a bottleneck or some other issue.

Aspects described herein characterize "states" of a plurality of slots in a burst based on the transport block size allocated to a UE during each slot. The transport block size (TBS) may be dependent on the amount or number of RBs allocated to the UE during the slot, as well as the modulation and coding scheme (MCS) used, the number of MIMO layers, and other configuration/overhead information. These states may be used by a UE to determine the duration of the burst and/or the extent to which a cellular network (or base station) was busy during one or more bursts of network traffic, and hence to identify bottlenecks in the downlink between a base station and the UE.

Figure 7B:
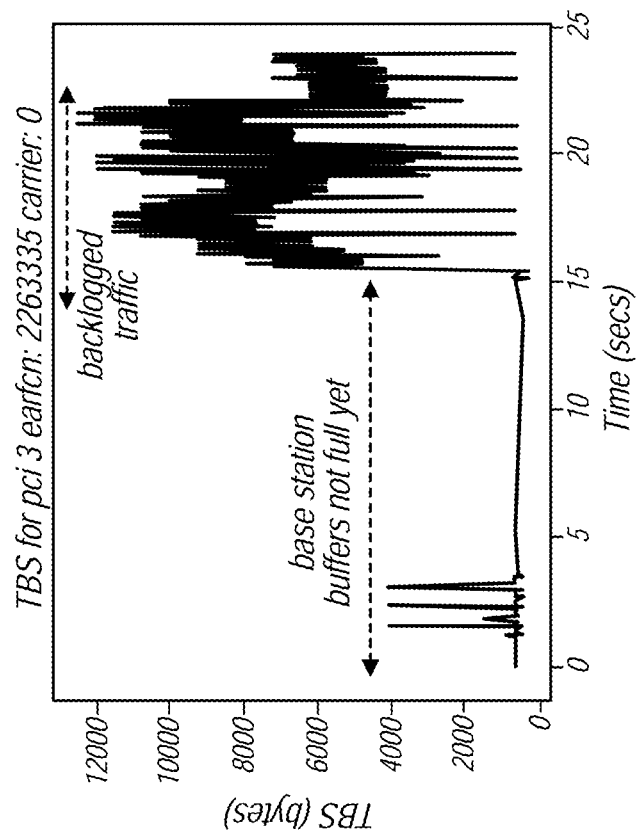
FIGS. 7A and 7B illustrate graphs which show backlogged traffic leading to higher transport block sizes.
Figure 7A:
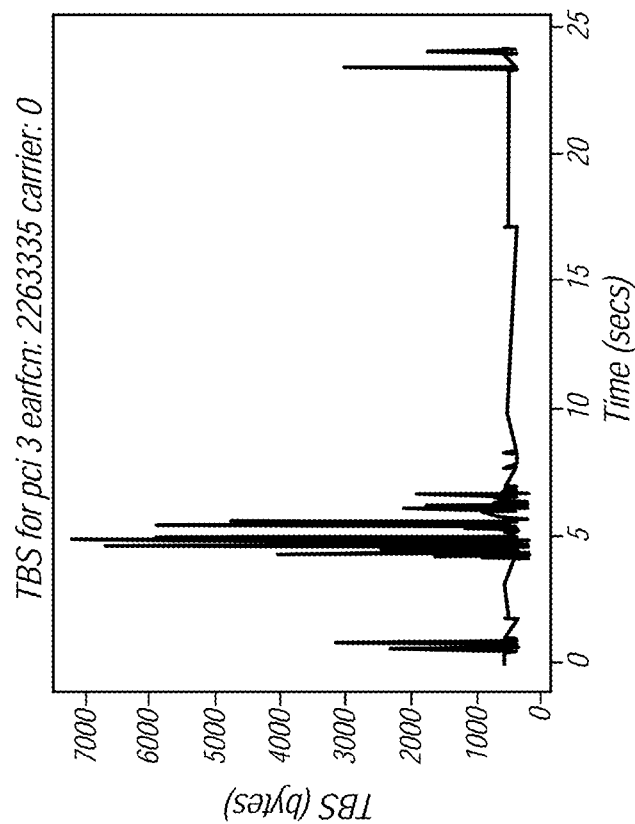

FIGS. 7A and 7B—Data Allocation Graphs

FIGS. 7A and 7B are graphs which illustrate the manner in which data allocation increases when data traffic is backlogged (or bottlenecked) at the base station. Data allocation in cellular networks may be captured by, or represented by, the Transport Block Size (TB S). The Transport Block Size depends on the following parameters: 1) Resource block allocation; 2) MCS (Modulation and Coding Scheme); 3) Number of MIMO layers; and 4) Various protocol related parameters and overhead.

The Transport Block Size increases when there is backlogged traffic in the base station. This is illustrated in the graphs of FIGS. 7A and 7B. FIGS. 7A and 7B show the TBS in a controlled near-cell 5G FR2 scenario, for two UDP (User Datagram Protocol) data rate settings: a) 200 Mbps (FIG. 7A) and b) 1 Gbps (FIG. 7B). In each of FIGS. 7A and 7B, time is along the x axis and TBS is along the y axis. As shown in FIG. 7A, data becomes backlogged somewhat around 1 second and 4-7 seconds, leading to a larger TBS size. As shown in FIG. 7B, from the period 0 to 15 seconds the base station buffers are not yet full. However, just after the 15 second mark traffic becomes backlogged, leading to much higher transport block sizes, as shown.

Figure 8:
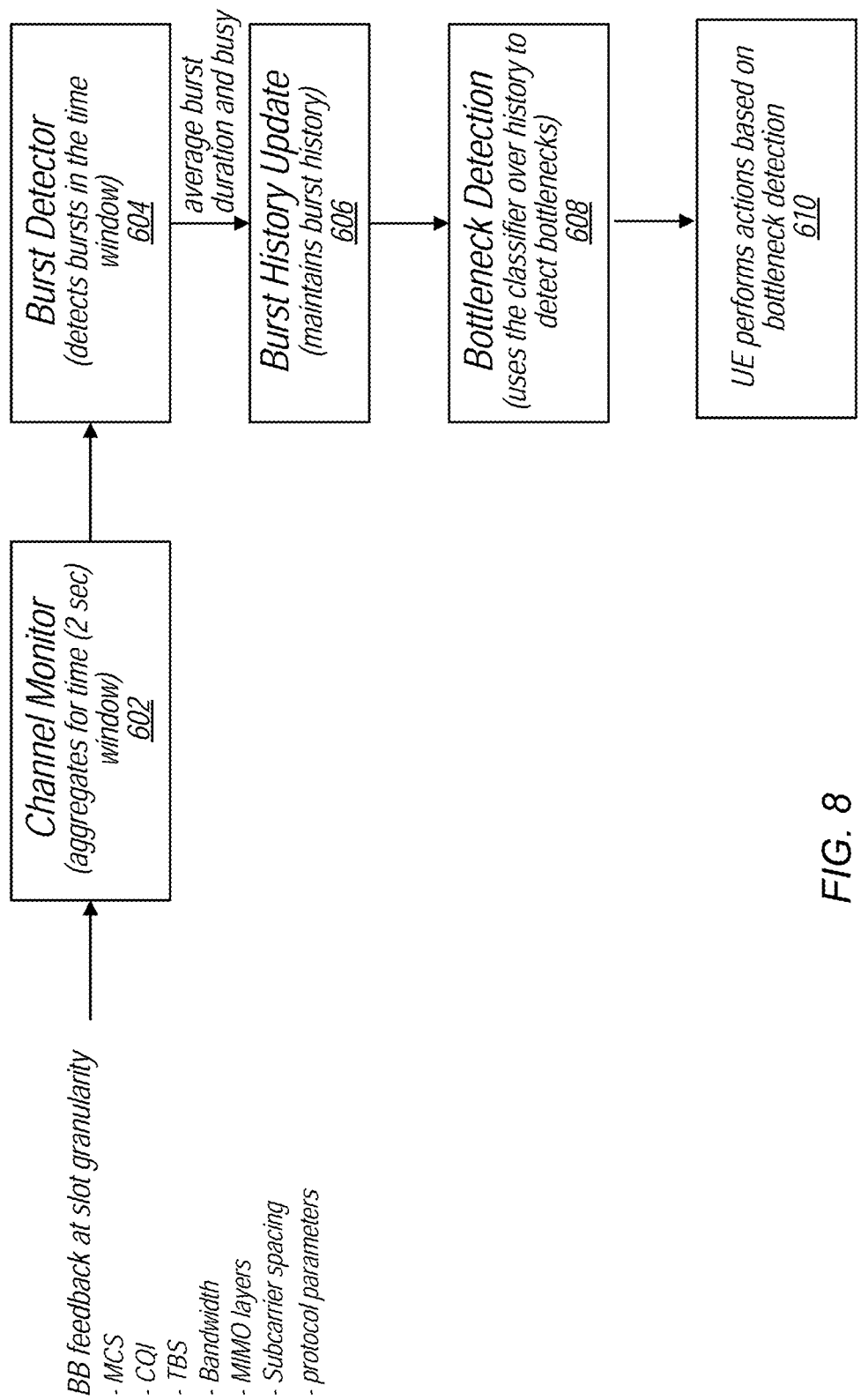
FIG. 8 is a flow diagram illustrating the high-level bottleneck detection method according to some aspects.

FIG. 8—Main Bottleneck Detection Flowchart

FIG. 8 is a flow diagram which illustrates the main operation of the bottleneck detection method.

As shown, the flow diagram includes a Channel Monitor step 602 which receives baseband feedback at a slot granularity and thus monitors various parameters in the network. The parameters monitored may include MCS, CQI, TBS, bandwidth, MIMO layers, subcarrier spacing, and various protocol parameters.

At 604 the UE may perform burst detection, e.g., may detect bursts in the time window. At 604 the UE may examine the TB S of each of a plurality of individual slots and identify or categorize them into states based on the data allocation (TBS) for each slot. The possible states may include Active slot, Last Active slot, Busy slot, and Underflow slot. In some aspects, the UE may utilize the transport block size (TBS) of each slot in determining the assignment of states to slots. The UE may also calculate and use the maximum possible TBS ($TBS_{max}$) in this analysis. This information is then used in identifying states of each the slots. The states may then be used to determine various burst characteristics, such as burst duration and busy estimation. Operation of burst detection in 604 is described further below with respect to FIGS. 9 and 10.

At 606 the UE may perform a burst history update, whereby the UE may store or maintain history of prior burst detection information so that the UE can calculate averages of these determined characteristics over a period of time. The UE may calculate averages of each of the determined burst characteristics to smooth out any anomalies in the detection. This method of performing bottleneck determination over a longer time window is described in more detail in FIG. 11.

At 608 the UE may perform bottleneck detection using the burst detection characteristics determined in 604, or using averages of the characteristic values maintained in the time window at 606. In 608 the UE may implement a bottleneck detection method over the history of maintained burst detection characteristic values in determining bottlenecks. Operation of bottleneck detection in 608 is discussed in greater detail in FIGS. 12 and 13.

In response to the UE detecting a bottleneck, the UE may perform various actions at 610. For example, the UE may be receiving the network traffic while operating on a first radio access technology (RAT). In response to determining that that the cellular network is experiencing a bottleneck, the UE may transition to a second different RAT to improve cellular performance. For example, the UE may transition from an LTE network to a 5G network, or vice versa, in response to detecting a bottleneck, where this transition or switch to a different RAT may operate to improve cellular performance.

Alternatively, or in addition, when the UE detects a bottleneck, at 610 the UE may take various actions that may result in energy savings. The detection of a bottleneck may cause the UE (or the UE may request the network to) enable/disable carriers and/or switch to wider/narrower channel bandwidths when there is bottleneck/no-bottleneck, respectively. For example, the UE may enable carriers and/or switch to a wider channel bandwidth when a bottleneck is detected at 608. In contrast, the UE may disable carriers and/or switch to a narrower channel bandwidth when no bottleneck is detected at 608 in order to conserve power (energy). This may allow the UE to achieve high performance at a low energy budget. This may also have the benefit of providing more efficient use of the wireless channel.

Bottleneck detection may be also be used to trigger Smart SIM Selection in 610. The method for detecting bottlenecks as described herein may allow for smart SIM switching upon identifying RAT bottlenecks in a certain SIM. Thus, if the method detects a bottleneck when operating using a first SIM, the UE may switch to a second different SIM, which may provide improved performance.

Thus the method described herein may operate to identify when a bottleneck situation is occurring in a radio access technology (RAT), as experienced by the downlink of the UE. As noted above, a network bottleneck may be characterized as a point in time where the application data rate cannot be accommodated by the wireless network. The method described herein may identify bottlenecks with only passive measurements, i.e., no additional or extra measurements may be required for the bottleneck detection method. Further, in some aspects the method makes no assumptions about the application data rate or core network performance, or about the base station implementation (e.g., scheduling or MCS selection algorithms).

The following figures and text provide more detail regarding the bottleneck detection method shown in FIG. 8.

Figure 9:
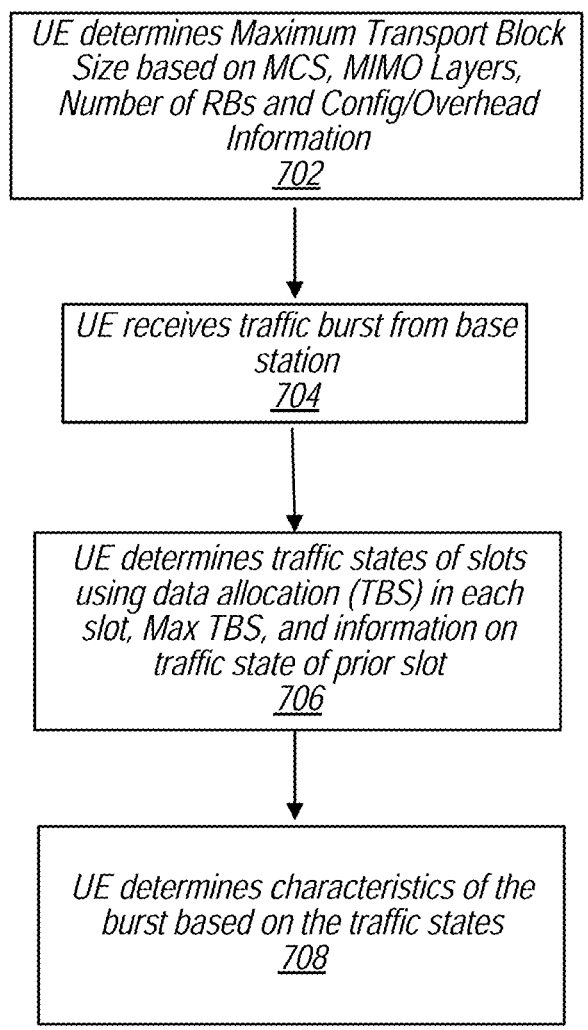
FIG. 9 is a flowchart diagram illustrating a method of burst detection in accordance with some aspects.

FIG. 9—Burst Detection Flowchart

FIG. 9 is a flowchart diagram which illustrates the operation of burst detection as mentioned above in 604 of FIG. 8.

At 702 the UE may determine the maximum transport block size for the channel between the base station and the UE. The UE may determine the maximum transport block size based on the modulation and coding scheme (MCS) being used, the number of MIMO layers, the maximum number of resource blocks (RBs) (per slot) supported by the current bandwidth, and various configuration/overhead parameters.

The UE may infer the maximum supported MCS based on received channel quality information (CQI). For example, a document titled "Physical layer procedures for data (3GPP TS 38.214 version 15.3.0 Release 15). Tables 5.2.2.1-2 to 5.2.2.1-5, shows mappings of CQI to modulation and code rate. In particular, the UE may use signal strength information from the CQI in order to infer the communication speed the BS can use.

For the number of MIMO layers, the UE may use the number of layers as provided by the baseband of the UE.

As noted above, the number of resource blocks used in determining the maximum transport block size may be the maximum number of resource blocks (RBs) (per slot) supported by the current bandwidth. For example, for a bandwidth of 100 MHz and sub carrier spacing of 120 kHz, the maximum number of RBs that can be allocated in a slot is 66.

The UE may also use various configuration/overhead parameters that are directly estimated in the baseband of the UE in order to calculate $TBS_{max}$. Such overheads may include Demodulation Reference Signal (DMRS) overheads as defined by 3GPP standard.

In some aspects, the UE may calculate the maximum TBS ($TBS_{max}$) for each time slot, so that the UE knows the effective or maximum TBS that can be supported at the particular time the slot was transmitted. In other words, calculation of $TBS_{max}$ for each slot allows the UE know for each particular time slot the maximum resources that the base station could have allocated. In other aspects, the UE may initially calculate the maximum TBS at the time the UE connects or attaches to the network and then may also periodically update its maximum TBS calculation when it detects that channel conditions may have changed, e.g., when the CQI indicates a significant change in channel conditions. Alternatively, the UE may calculate the maximum TBS for each burst, e.g., each time a first Active slot or Last Active slot is detected.

The maximum TBS is the TBS that would be assigned to the UE if the base station allocated all of the communication resources to the UE, e.g., assuming this UE is the only UE in the network. In other words, $TBS_{max}$ is the TBS that would be assigned to the UE if there are no other UEs (phones) contending for network resources.

At 704 the UE may receive a traffic burst from the base station. In other words, at 704 the UE may receive network traffic from the cellular network during a series of transmission slots.

At 706 the UE may analyze the transport block size of the plurality of transmission slots. More specifically, the UE may compare the transport block size of a received transmission slot to the maximum transport block size for the channel calculated in 702. The UE "knows" the actual data allocation—how many resources the base station assigned to the UE in the time slot. Thus the UE knows the actual TBS (how much data was actually received in that particular time slot). Also the UE has estimated $TBS_{max}$ in 702 as described above. Thus for each slot the UE knows much data the UE received, and the UE also knows $TBS_{max}$, how much data it could have potentially received if no other UE was present in the network. The UE can thus determine the particular state for a respective slot based on these two values. In some aspects, the possible states are one or more of: Active, Last Active, Busy or Underflow (Idle).

For example, the UE may calculate the ratio of the transport block size of a received transmission slot to the maximum transport block size and compare this to a threshold. This analysis of the transport block size of each of a plurality of received transmission slots may be used to identify states of respective ones of the transmission slots. Stated another way, the UE may identify or classify respective ones of the transmission slots as having various states, based on the transport block size analysis, in order to determine characteristics of the burst containing these transmission slots in 708. Thus at 706 the UE may classify or identify transmission slots as being one of a plurality of possible states. In other words, the UE may identify states of respective ones of the transmission slots based at least in part on a transport block size of each of the respective slots.

As mentioned above, at 708 the UE may determine characteristics of the network traffic burst based on the identified states of the transmission slots within the burst. The determined characteristics may comprise one or more of: a) a duration of the burst of network traffic; or b) a busy estimation of the burst of network traffic.

It is important to note that the UE may determine the characteristics of the burst of network traffic based on the identified states of the transmission slots, wherein the identified states are themselves determined from transport block size analysis. Thus the UE may not determine the existence of a bottleneck directly from its TBS analysis, but rather determines the existence of a bottleneck from identified states of the various slots. However, from a broader view, the UE may be considered to be determining characteristics of the burst of network traffic indirectly based on the transport block size analysis of the plurality of transmission slots in 706. In other words, the UE may be said to determine the existence of a bottleneck "indirectly" from its TBS analysis.

For example, at 706 the UE may identify Active and Busy states of respective ones of the transmission slots in the burst based at least in part on the transport block size of each of the respective slots. More specifically, the UE may identify one or more slots in the burst as an Active slot by determining that the transport block size of the slot relative to the maximum transport block size is greater than a threshold.

At 708 the UE may determine a busy estimation of the burst of network traffic based on a relative number of Active and/or Busy states in the burst (or based on the percentage of Active slots and/or Busy slots in the entire burst). As discussed further below with respect to FIG. 13, the UE may determine that the cellular network is experiencing a bottleneck based at least in part on the busy estimation, e.g., based at least in part on a percentage of slots in the burst of network traffic that are determined to be Active and/or Busy.

As another example, at 706 the UE may identify a first (initial) Active and Last Active transmission slot in the burst. As noted above, the UE may identify one or more slots in the burst as an Active slot by determining that the transport block size of the slot relative to the maximum transport block size is greater than a threshold. The UE may determine the first (initial) Active transmission slot (the beginning or first slot of the burst) as a transmission slot having an Active state immediately preceded by a transmission slot with no resource blocks allocated to the UE. The UE may identify a slot in the burst as a Last Active slot by determining that the transport block size of the slot relative to the maximum transport block size is lower than a threshold. More specifically, the UE may determine the Last Active transmission slot as a transmission slot having a nonzero percentage of resource blocks containing data for the UE that is less than a threshold.

At 708 the UE may determine the duration of the burst based on the identified first Active and Last Active transmission slots in the burst. In other words, the duration of the burst may be calculated as a time interval starting with a beginning Active slot and ending with the determined Last Active slot. As discussed further below with respect to FIG. 13, the UE may determine that the cellular network is experiencing a bottleneck based at least in part on the duration of the burst.

Figure 10:
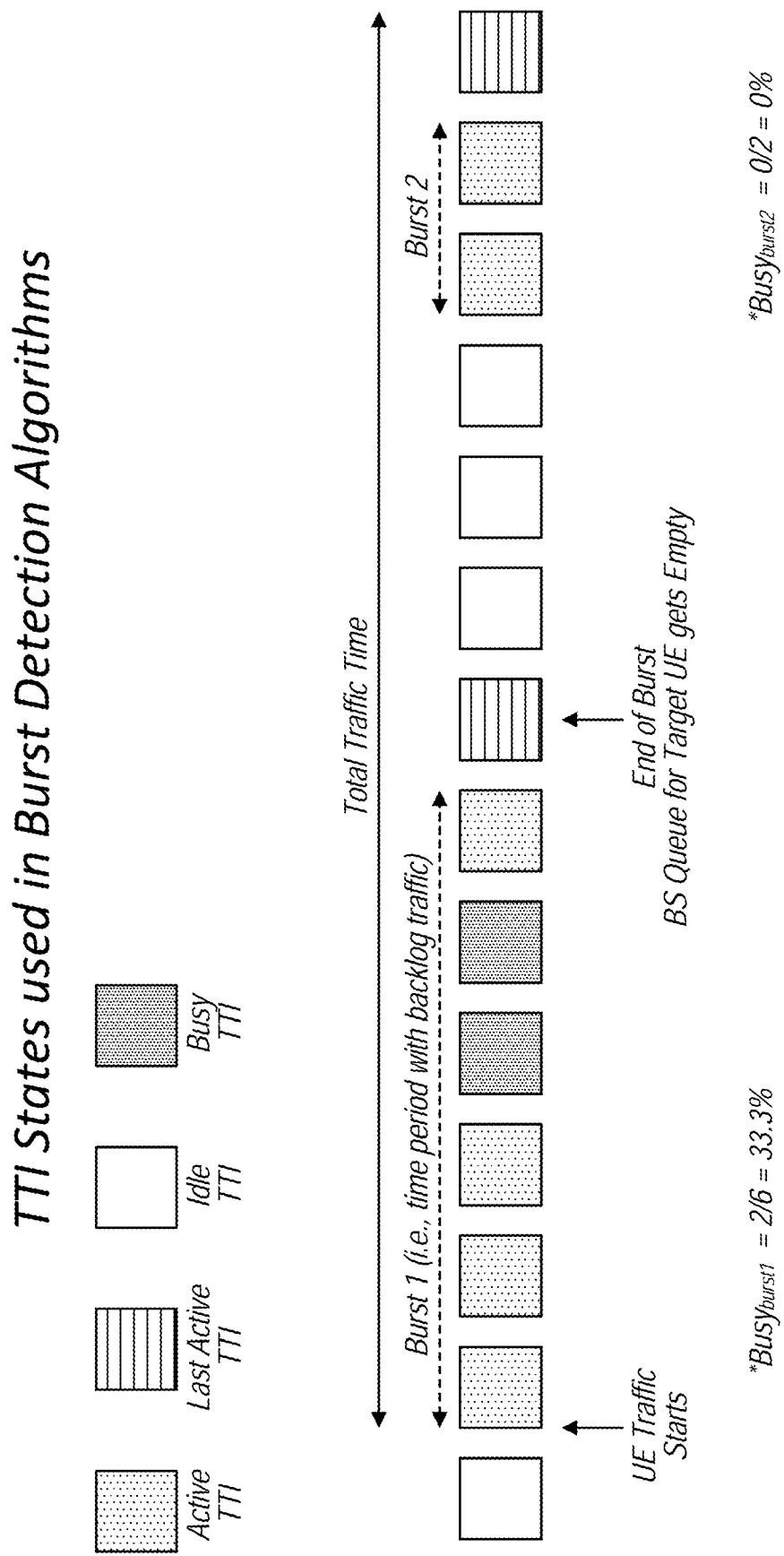
FIG. 10 illustrates identification of various slot states in accordance with some aspects.

FIG. 10—States Used in Burst Detection Methods

FIG. 10 illustrates transmission slot (TTI) states used in burst determination methods in accordance with some aspects described herein. Four slot states are defined: Active Slot, Last-active Slot, Busy Slot and Idle (Underflow) Slot.

In the aspects described herein, the UE may utilize analysis of the transport block size (TB S) to determine or identify the state of a respective slot. As an alternative to using TBS, in some aspects the method may use resource block (RB) allocations to identify states of slots, as described in U.S. patent application Ser. No. 16/888,555 referenced above. For example, U.S. patent application Ser. No. 16/888,555 was described in the context of an LTE cellular network environment and used resource block allocation to identify states of slots. However, in a 5G network environment, resource schedulers operate differently than those in LTE. Thus, for a 5G cellular network, the method preferably does not just rely on RB allocation (scheduling patterns) but rather utilizes a broader concept of data allocation (Transport Block Size or TBS) in identifying states of slots. As noted above, Transport Block Size (TB S) is a function of resource allocation (resource block allocation) as well as other factors, such as MCS, number of MIMO layers and other configuration/overhead factors.

An Active slot may be defined as a slot wherein the base station data allocation (i.e., the transport block size) during a time slot is approaching or close to the maximum possible data allocation (i.e., approaching the maximum possible TBS). For example, a slot may be deemed to be an Active slot when the per-slot TBS is close to the maximum possible TBS, e.g., $$\frac{TBS}{TBS\max} > T$$

where T is a threshold. The threshold T may be any of various values, e.g., between 0.4 and 0.6. One example of a threshold T is 0.5.

In an Active slot, the actual transport block size of the slot is a large percentage of the maximum TBS, and hence this slot is presumed to be part of a burst of download network traffic from the network (base station) to the UE. For example, if the TBS (data allocation) the UE receives is close to the maximum allocation that the UE could receive, this means that the UE's application is pushing a lot of data to the UE, close to the maximum allocation. This may happen when a significant amount of data destined for the UE is buffered at the base station waiting to be transmitted to the UE. In this case, the data allocation will be close to $TBS_{max}$.

As a simple analogy, assume a wireless channel between the base station and the UE where an application (e.g., Netflix) sends data at a particular rate to the BS. If the pipe (the wireless speed) between the BS and the UE is small, then the base station may not be able to accommodate what the application is providing. In other words, the application (Netflix) may be pushing data faster than what the network can accommodate, and hence data will accumulate in the base station. In this case, the data allocation that the UE will see in a time slot is closer to the maximum (closer to $TBS_{max}$), because there is a lot of data that the UE needs to receive from the base station to accommodate the application. Thus a number of the slots will be Active states, indicating an ongoing traffic burst.

If the data allocation becomes very small, much smaller than $TBS_{max}$ (smaller than what the BS could support), then the application is not (or no longer) pushing lots of data to the base station. In this case, the base station is done accommodating the application, e.g., is done with the current traffic burst.

Where the method uses resource block allocations in identifying states instead of TBS, the method may determine a slot is an Active slot where the percentage of RBs allocated to a UE is greater than a high threshold, such as 75%. In this aspect, for an Active slot, when a large percentage of the resource blocks of the slot are allocated to the UE, and hence this slot is presumed to be part of a burst of download network traffic from the network (base station) to the UE.

A Last-active slot may be defined as a slot where the per-slot TBS is much lower than the maximum possible TBS ($TBS_{max}$), e.g., where:

$$\frac{TBS}{TBS\max} \le T$$

In a Last-active slot, a smaller percentage of total transport block size is allocated to the UE, and hence this slot is presumed to indicate the end of the burst. This is based on the notion that at the end of the burst the "leftover" or "last remaining" data is being transmitted, which will typically not as close to the full or maximum TBS, but rather will typically be a smaller TBS (except in a few outlier cases).

Where the method uses resource block allocations in identify states instead of TBS, the method may determine a slot is a Last-active slot when the percentage of RBs allocated to a UE is less than the high threshold, such as 75%, and is nonzero (greater than 0%). In a Last-active slot, a smaller percentage of resource blocks are allocated to the UE, and hence this slot is presumed to indicate the end of the burst.

A Busy slot may be defined as a slot wherein the UE is not scheduled in the current slot and the previous slot was Active. In the case of a Busy slot, the TBS is zero (no resource blocks are allocated to the UE in the slot), and this slot follows an Active slot (not a Last-active slot), meaning that this slot is presumed to be within a continuous burst (since the Last-active slot has not yet been received). Where the method uses resource block allocations in identify states instead of TBS, the method may determine a Busy slot when the percentage of RBs allocated to a UE is zero or 0% (i.e., where the UE is not scheduled during the slot) and where the previous slot is an Active slot.

An Underflow slot (also called an Idle slot) may be defined as a slot in which the UE is not currently scheduled (not scheduled in the current slot) and the previous slot was a Last Active or Underflow slot. In the case where a slot is identified as an Idle slot, no resource blocks are allocated to the UE in the slot, and this slot follows a Last-active slot (not an Active slot), meaning that this slot is presumed to be after the end of a continuous burst, e.g., may be between bursts when the base station is transmitting data to other UEs.

Where the method uses resource block allocations in identify states instead of TBS, the method may identify a slot as an Underflow or Idle slot when the percentage of RBs allocated to the slot is 0% (i.e., wherein the UE is not scheduled during the slot) and wherein the previous slot is a Last-Active slot or an Idle slot.

FIG. 10 shows examples of two determined bursts, Burst 1 and Burst 2. As shown, a burst may be determined as beginning with a transmission time interval (slot) that is identified as a first Active slot (an Active slot preceded by an Idle slot) and ending with an identified last Active slot (Last-active slot). Burst 1 comprises six slots, four of which are Active slots and two of which are Busy slots. Burst 2 comprises two slots, both of which are Active slots (and with no Busy slots). In the example of FIG. 10, the burst lengths or durations are measured such that they do not include the associated Last-active slot. Alternatively, a burst duration may be measured such that it does include the associated Last-active slot.

A base station may be determined to have a busy percentage that is equal to the number of Busy slots during a burst divided by the total number of slots in the burst. Consistent with this definition, Burst 1 may be described as having a busy percentage of 33.3%, wherein 2 slots are identified as Busy and 4 slots are identified as Active, yielding a ratio of 2 divided by 6 or 33.3%. Alternatively, the Last-active slot may also be counted as part of the burst, and thus the ratio would be 2 divided by 7 or 28.5%.

Burst 2 may be described as having a busy percentage of 0% since it does not have any Busy slots.

Bottlenecks in a downlink may result from various scenarios, such as the application data rate being greater than the RAT throughput, the presence of high contention between UEs receiving network traffic from the same base station, etc. The first scenario may result in bursts of high duration, for example, bursts having durations that are greater than 2 seconds. The second scenario may result in bursts of significant duration that also have a high busy percentage, for example, bursts having durations greater than or equal to a predetermined number of milliseconds (e.g., 10-15 ms) and busy percentages greater than a certain percentage (e.g., in the range of 40%-60%, such as 50%). Aspects described herein may operate to determine a bottleneck in a downlink by identifying the aforementioned conditions, as discussed below with reference to FIG. 13.

Figure 11:
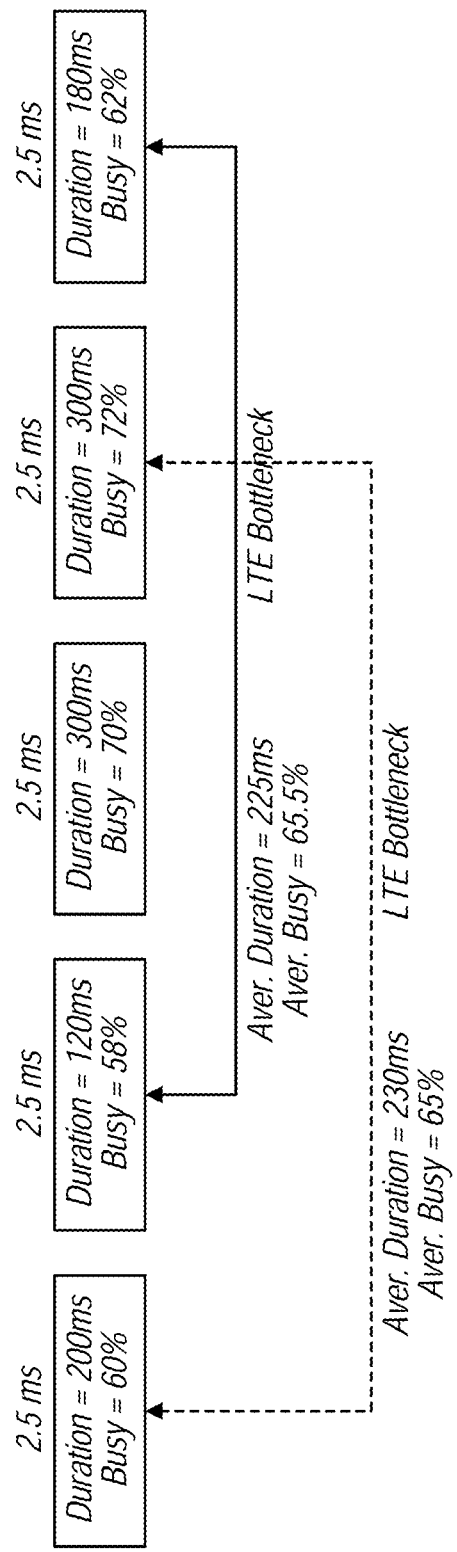
FIG. 11 illustrates an example bottleneck determination over multiple time windows in accordance with some aspects.

FIG. 11—Bottleneck Determination Over Multiple Time Windows

In some aspects, the method may calculate burst duration and burst busy percentage (contention) as an average over a plurality of bursts. In other words, the method may calculate burst duration and burst busy percentage for each of a plurality of bursts and then average the results to produce final (averaged) burst duration and burst busy percentage values. The method may then use this calculated average value in determining bottleneck contention.

One reason for the use of average burst characteristic values is as follows. Infrequently, a burst of network traffic may be of a size that completely fills an integer number of slots (TTIs) fairly precisely. In such a case, the burst of network traffic would be indicated by an integer number of Active slots only, i.e., there may not be a "leftover" or "last remaining" amount of data that takes up only a fraction of the last slot of the burst. In this case, for a particular burst the method may not be able to identify a Last-active slot associated with the end of the burst. In order to ensure burst determination (and subsequent bottleneck determination) in such a situation, the bottleneck detection method may calculate an average burst duration and average busy percentage (contention) over multiple time periods. This may operate to "average out" a particular burst whose duration or busy percentage is not properly identified. An example of such an averaging method is shown in FIG. 11.

FIG. 11 illustrates five consecutive time period windows, each having a duration of 2.5 seconds. One or more bursts (typically a plurality of bursts) may be determined within each time period. The average of both the duration and the busy percentage of the bursts within each time period may be indicated within each corresponding time period window. A moving average of burst duration and busy percentage may be calculated for each of the two sets of four consecutive time windows. In these examples, both moving averages determine a bottleneck, which is consistent with the parameters of each individual time window.

The approach of FIG. 11 may be particularly useful in situations where a burst of network traffic fills an integer number of slots precisely and is therefore not detected by the bottleneck method described in FIG. 10. In such situations, a bottleneck detection method involving averaging over time windows may result in more accurate detection of the typical burst duration and/or more accurate estimation of the extent to which the network is busy.

The duration of each time window may be 2.5 seconds, as indicated by the example of FIG. 11. However, the duration of each time window may be of any desired length, ad is preferably longer than the burst-duration threshold (e.g. 2 seconds). Likewise, it should be noted that the moving average calculation need not be restricted to four time windows. Rather, the number of time windows used to calculate the moving average may vary in accordance with the properties of the system being analyzed.

Figure 12:
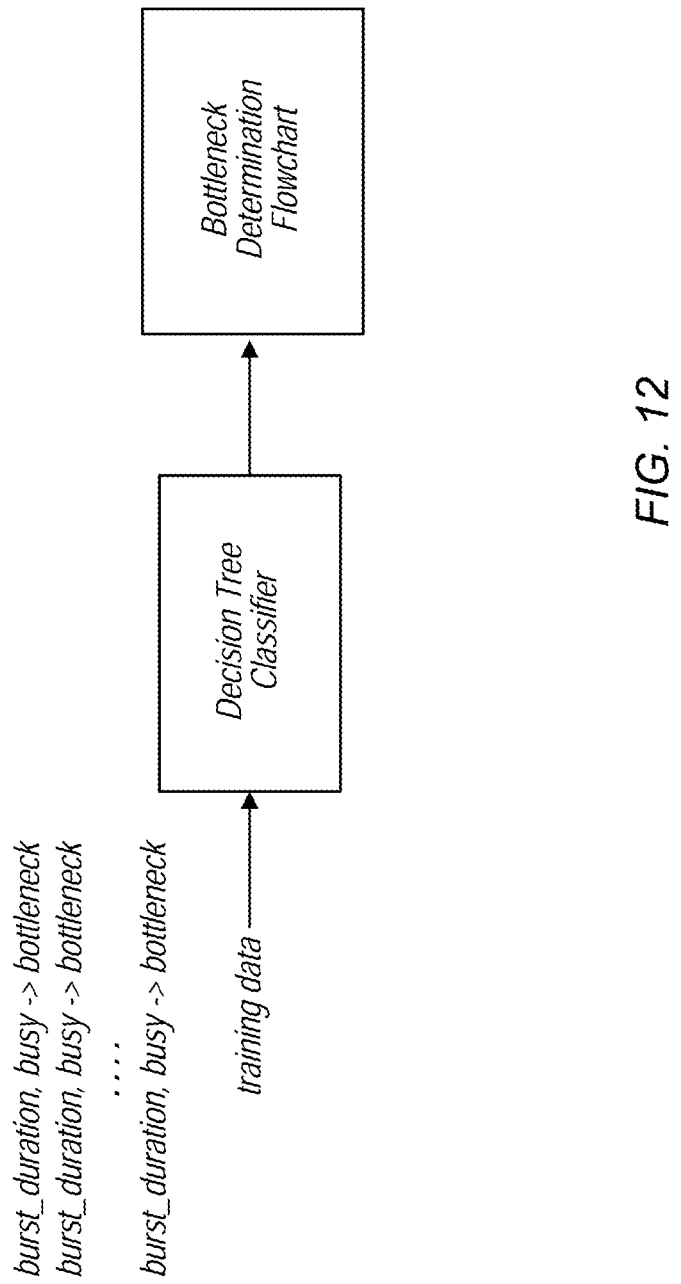
FIG. 12 illustrates a method of bottleneck determination using a classifier according to some aspects.

FIG. 12—Bottleneck Determination Classifier

FIG. 12 illustrates a method for designing or configuring a bottleneck determination method according to some aspects. The method shown in FIG. 12 may take place in the design phase, i.e., during the design of the UE. In some aspects, the design method may utilize a classifier to determine an appropriate methodology for determining the existence of bottlenecks. For example, the method may use any suitable machine learning methodology, such as a decision tree classifier, to determine the criteria used for determining the occurrence of a bottleneck.

In some aspects, laboratory experiments were performed which involved the creation of bottleneck situations and non-bottleneck situations. During these lab experiments, the burst duration and the "busy estimation" (the degree to which the network was busy) were measured. These experiments and measurements were used to observe what types of burst duration and busy estimation values were present in both bottleneck situations and non-bottleneck situations.

This information was then used in designing the method used for bottleneck determination. More specifically, as shown in FIG. 12, measured burst duration and busy estimation values, as well as information regarding whether a bottleneck or non-bottleneck situation was present at the time of the respective measurements, was fed as training data into the classifier (a machine learning system). The classifier then produced a bottleneck determination flowchart based on this information. One example of a bottleneck determination flowchart is shown in FIG. 13.

As one example, in one experiment a UE is configured to download a video from the Internet and a resource contention scenario is created during the experiment whereby the video download stalls, meaning that a bottleneck is occurring. The designers measure the burst duration and busy estimation during the experiment to help understand how the burst duration and busy estimation values appear during a bottleneck. Many experiments of this type are performed, and the resultant data is fed to the classifier. The output of the classifier may be a method or algorithm that, based on burst duration and busy estimation values measured in actual use of the UE, is capable of accurately determining the presence of a bottleneck.

In the current method, during real-time operation the UE operates to analyze the transport block size (TBS) of each of a plurality of individual slots and then use this analysis to assign states to the respective slots. These states are then used to measure a burst duration value and/or calculate a busy estimation value for identified bursts in the received network traffic. In some aspects, a "run-time version" of the classifier may be used instead of (or in addition to) the above operation. Thus, during real-time or actual UE operation by a user, the method may analyze the TBS of a plurality of slots (e.g., compare the TBS to a $TBS_{max}$) and then feed the results into a run-time classifier (a run-time machine learning system) executing on the UE. In response, the run-time classifier then outputs a bottleneck determination output. This output may be binary (i.e., a bottleneck is or is not currently present) or may be a wider range of values to indicate the degree to which a bottleneck is deemed to be present. This bottleneck determination output may then be used to adjust the operation of the UE as described herein.

Figure 13:
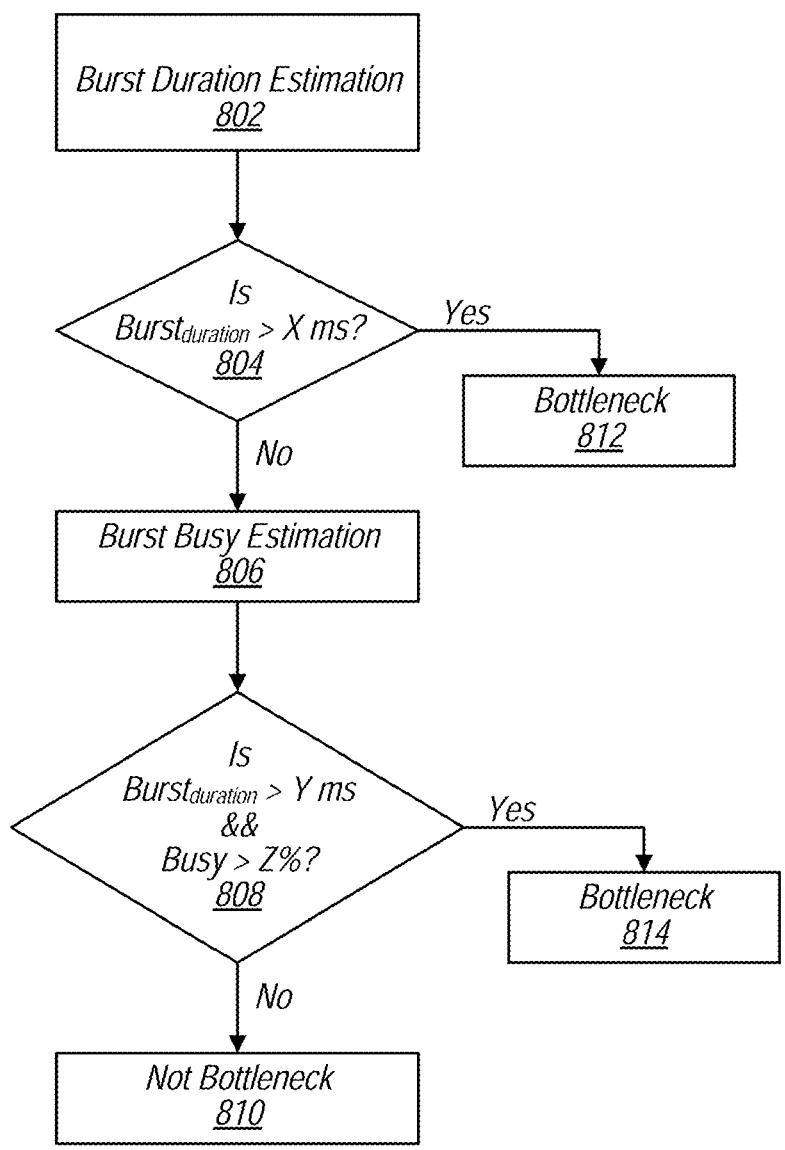
FIG. 13 illustrates a flowchart for an example bottleneck determination method in accordance with some aspects.

FIG. 13—Bottleneck Determination Flowchart

FIG. 13 illustrates a bottleneck determination method flowchart in accordance with some aspects described herein. The method of FIG. 13 may be performed by a UE, e.g., may be performed by each of a plurality of UEs served by a cellular network. As previously described, the method may analyze Transmission Block Size (TB S) (including resource allocations) in received slots (TTIs) to determine whether a bottleneck likely exists.

At 802, the method may determine a burst and may estimate the duration of the burst. As explained above, a burst may be determined as beginning with a slot that is first identified as an Active slot (an Active slot preceded by an Idle or Underflow slot) and ending with an identified Last-Active slot. The duration of a burst may include all of the slots within the burst, possibly excepting the Last-Active slot. In an Active slot, the current TBS of the slot relative to the maximum TBS is greater than a designated threshold (or alternatively more than a high threshold (e.g., the actual TBS is greater than 50% of $TBS_{max}$). In the Last-active slot, the current TBS of the slot relative to the maximum TBS is lower than a designated threshold, e.g., the current TBS is less than 50% of $TBS_{max}$.

After identifying the burst and determining the duration of the burst, at 804 the method may determine whether the length of a burst is greater than a burst-duration threshold (e.g. X ms). A burst of "long" duration (exceeding a "burst-duration threshold") indicates that a considerable amount of time was required by the base station to transmit requested data to a UE. A long burst may imply that the base station's data buffers are full, i.e. that there is a "backlog" of UE application data at the base station. This backlog may suggest that the UE's application data rates are greater than the throughput of the RAT downlink channel, resulting in a bottleneck. The burst-duration threshold may be dependent on the type of RAT, where the burst-duration threshold may be longer for LTE implementations than for NR implementations. The burst-duration threshold may be any of various values. In this NR example, the burst-duration threshold X could range between 10-16 ms as one example. However other threshold values may be used to indicate a "long" burst.

If the UE determines that the burst exceeds the burst-duration threshold, the UE determines a bottleneck at 812, and operation completes, e.g., returns to 802 for monitoring of newly received bursts. If the length of the burst is less than the burst-duration threshold, the method proceeds to 806.

At 806, the method may estimate the busy percentage of the burst. As explained above, a base station may be determined to have a busy percentage that is equal to the number of Busy slots during a burst divided by the total number of slots in the burst. A Busy slot immediately follows an Active slot and comprises zero RBs allocated to the UE.

The presence of Busy slots within a burst may indicate that during the time the base station was in the process of sending data to the UE, (as indicated by the Active slots in the burst), the cellular network (the base station) was required to transmit data to one or more other UEs (as indicated by the Busy slots during the burst). As a result, the base station interrupted its service to the UE in order to attend to these conflicting demands. This situation, where one or more UEs are competing for scarce resources, is known as "contention" between UEs.

Therefore, calculating a busy percentage of a burst may lead to an indication of a bottleneck. In one aspect, a busy percentage may be calculated by dividing the total number of Busy slots during a burst by the total number of Active slots during the burst. The UE may perform other methods or procedures to determine the extent to which the network is busy.

A burst of moderate duration (greater than a medium-duration threshold, e.g. Y milliseconds, but less than a "long" burst-duration threshold, e.g. X ms) may not be long enough by itself to imply that there is a backlog of data at the base station, which may indicate a bottleneck. However, in this aspect, a burst of at least moderate duration or longer and also having a significant busy percentage may indicate contention, and therefore a bottleneck.

At 808, the method may determine whether the burst is greater than a medium-duration threshold (e.g., Y milliseconds) and whether the burst has a busy percentage greater than a certain percentage, referred to as Z % (e.g., 50%). The medium-duration threshold Y is less than the long-duration threshold X and may be dependent on the type of RAT being used. The medium-duration threshold Y may be any of various values, such as, for example, for an NR implementation in the range of 5 to 8 ms. Any of various Busy percentage thresholds may be used in determining whether the cellular network is busy, such as a busy threshold percentage ranging from 40% or higher.

If the answers to both determinations are yes, at 814 the method may determine a bottleneck. If the answer to one of the determinations is no, then at 810 the method may determine that there is not a bottleneck. In this case, the method may return to 802 and begin assessing a new burst.

The flowchart of FIG. 13 may be performed repetitively or continuously to continually assess whether a bottleneck exists in the network. In some aspects, the method of FIG. 8 may be disabled or turned off during periods, or in geographic areas, when a bottleneck is unlikely to occur. In some aspects, a UE may share its bottleneck determination with other neighboring UEs. In some aspects, the UE may employ different X, Y and/or Z thresholds depending on the type of RAT currently in use, and the UE may switch to a different set of thresholds when it switches from one RAT to another.

In response to detection of a bottleneck, the UE may operate to switch to using a different RAT. For example, the UE may be operating on an LTE network when it detects a bottleneck using the method described above. The UE may be operating on an LTE network since it may have less power requirements, or possibly more available bandwidth, than a more modern RAT, such as NR. A bottleneck identified on the LTE network may indicate that the speed of the LTE network cannot accommodate the application data rate of an application executing on the UE (such as a game). A bottleneck identified on the LTE network may also, or instead, indicate that too many UEs are vying for attention of the base station (the network). Note that method described herein may identify bottlenecks using only passive measurements, i.e., using only data that is already being sent to the UE. Further, the method may make no assumptions about the application data rate or core network performance.

In response to detecting a bottleneck on the LTE network, the UE may transition to a different RAT, such as a 5G RAT (New Radio or NR) which presumably has less network congestion. It is noted that the UE may transition back to the LTE network later based on various criteria.

The aspects described herein may be used in various use cases. For example, the method may be used in a "Smart Data Mode", wherein upon detecting a bottleneck the UE can enable its 5G interface (transition from using LTE to using NR) to improve cellular performance. The method may also be used in a Low Power Mode, where the method allows the UE to operate using an LTE RAT to save energy, and switch to a different RAT, such as 5G, only when it is deemed necessary (only when a bottleneck is detected). The method may also be used in Smart SIM selection. The method may allow for smart SIM selection upon identifying RAT bottlenecks in a certain SIM.

Figure 14:
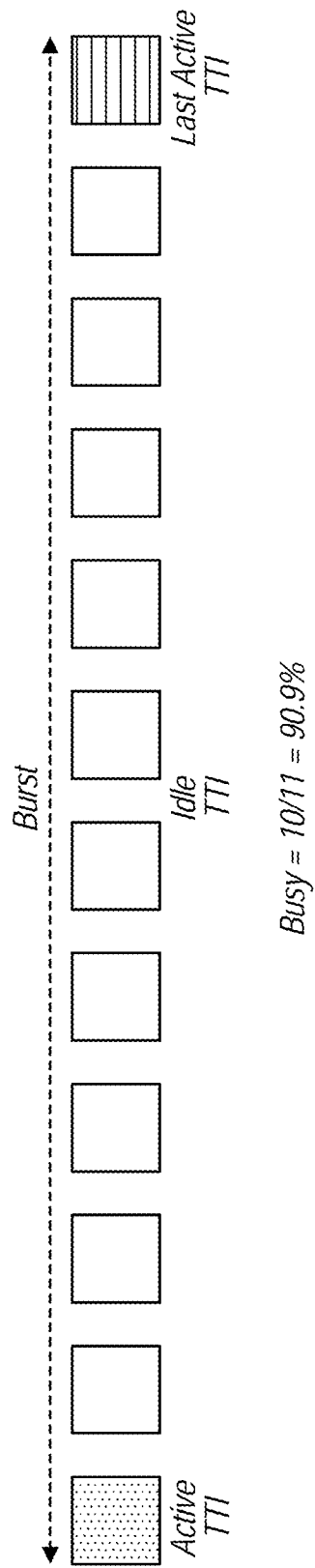
FIG. 14 illustrates an example short burst interrupted by a measurement gap in accordance with aspects described herein.

FIG. 14—Short Bursts

Sometimes bursts are received by a UE which are of less than a moderate duration (e.g. 40 milliseconds or less in an LTE implementation). Since short bursts indicate sparse traffic, certain aspects do not consider short bursts to be indicative of a bottleneck. Since busy estimation of short bursts may be unreliable, certain aspects do not consider whether these short bursts have a busy percentage.

Busy estimation for short bursts may be unreliable because Idle slots resulting from measurement gaps may be mistaken for busy slots. FIG. 14 illustrates an example of such a scenario. FIG. 14 shows an LTE implementation with a short burst of 11 milliseconds (1 slot or TTI=1 millisecond), interrupted by a measurement gap (represented by ten Idle slots) of 10 milliseconds. LTE implementations may consider a short burst to be of a duration between 0 ms and 40 ms. However, this threshold may vary depending on the duration and periodicity of measurement gaps in the RAT under analysis.

FIGS. 15-19: Example Operation

Figure 15:
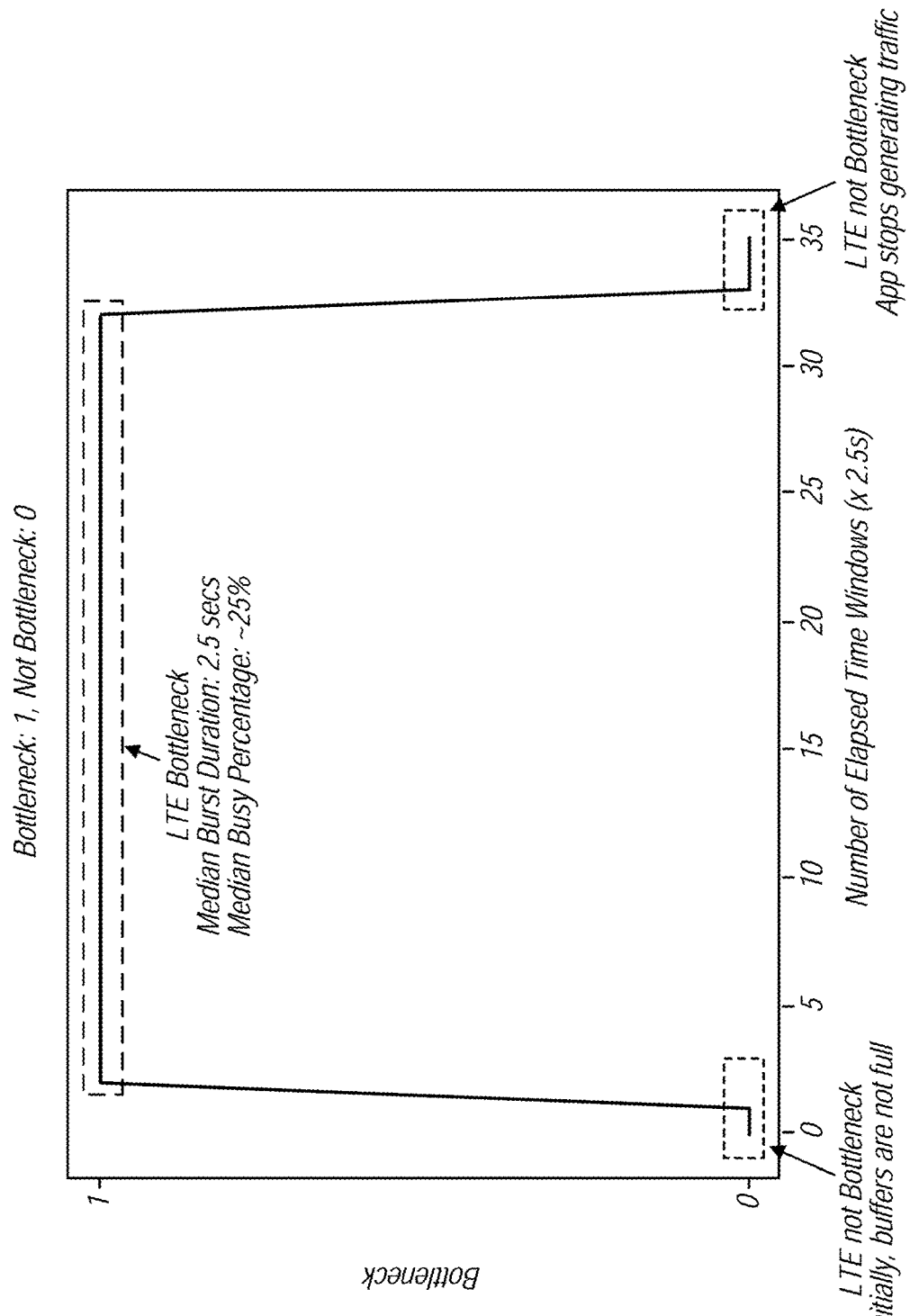
FIG. 15 is a graph illustrating a determination of a bottleneck in accordance with aspects described herein.
Figure 19:
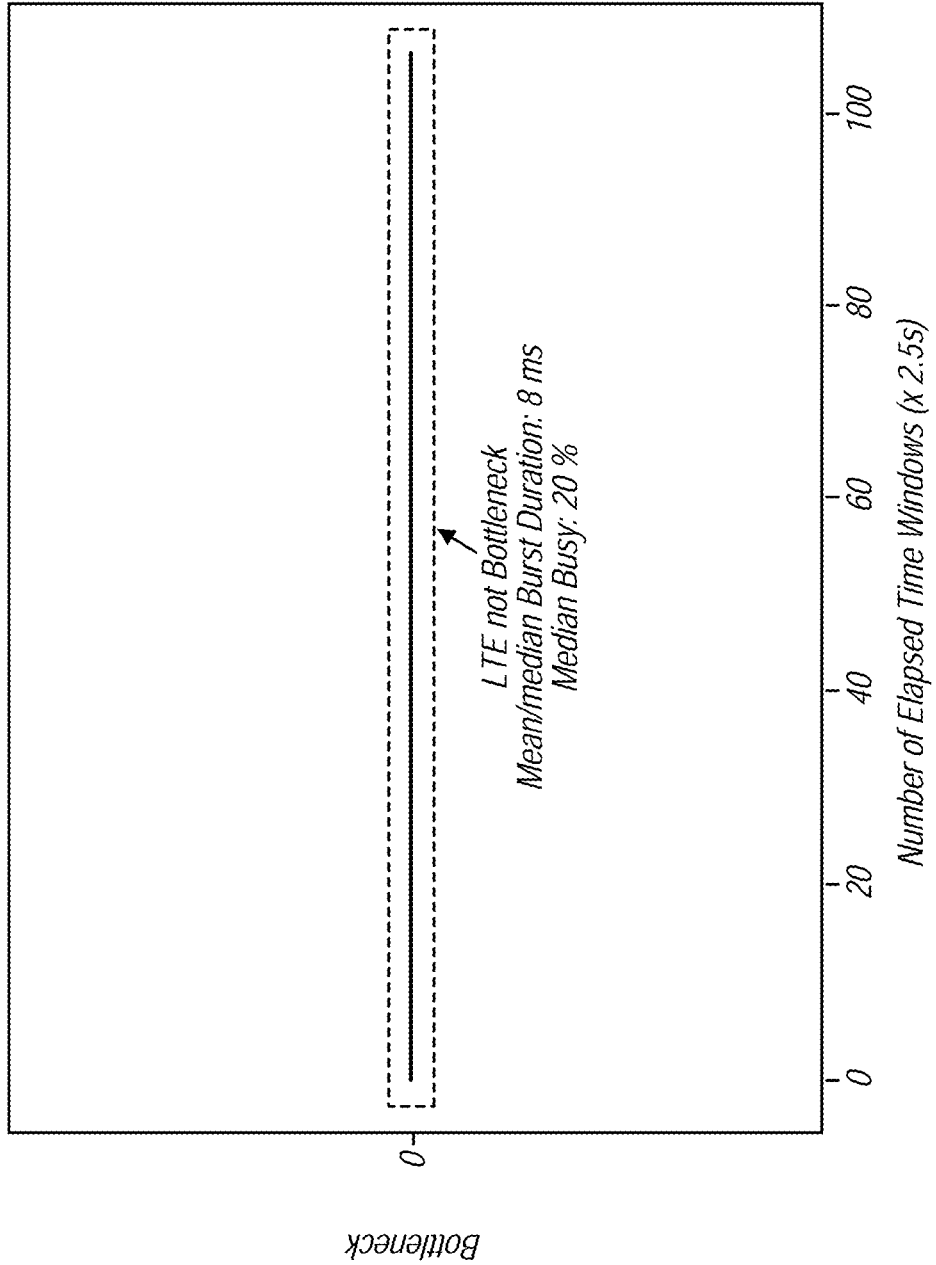
FIG. 19 is a graph illustrating determination of "no bottleneck" in accordance with aspects described herein.

FIGS. 15 and 19 show examples in an LTE implementation.

FIG. 15 shows an example of the detection of a bottleneck by the method described herein. The graph of FIG. 15 represents the results of an experiment involving a downlink file transfer protocol (FTP) to a UE of 222.65 Mbps. The RAT throughput was <200 Mbps and there was no contention from other UEs. The method determined a median burst duration of 2.5 seconds and a median busy percentage of about 25%. The method therefore determined a bottleneck resulting from high application data rates (burst >2 s) and no contention (Busy percentage <50%). The existence of a bottleneck during this time period is confirmed by the presence and absence of application data in the data buffers of the UE under test.

Figure 16:
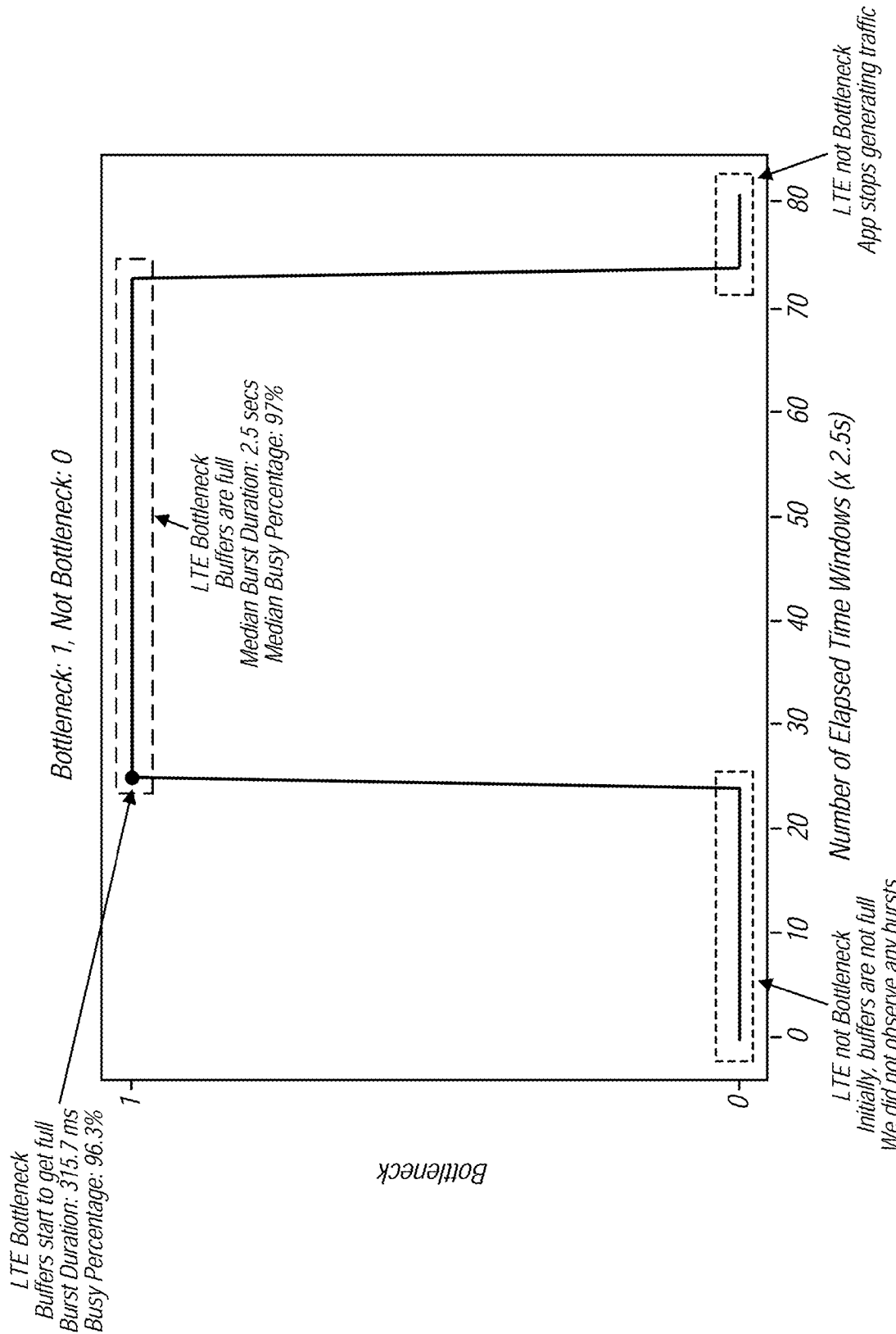
FIG. 16 is a graph illustrating a determination of a bottleneck in accordance with aspects described herein.

FIG. 16 shows an example of the determination of a bottleneck by an aspect of the method. The graph of FIG. 16 represents the results of an experiment involving a downlink file transfer protocol (FTP) to a UE of 222.65 Mbps. The RAT throughput was <200 Mbps and there was contention from a total of 18 UEs. As indicated by the graph, the method first determines a bottleneck by determining a burst duration of 315.7 ms having a busy percentage of 96.3%. A bottleneck continues to be determined over a period of about fifty time windows (2.5s per time window), during which time the median burst duration is 2.5 seconds and the median busy duration is 97%.

Figure 17:
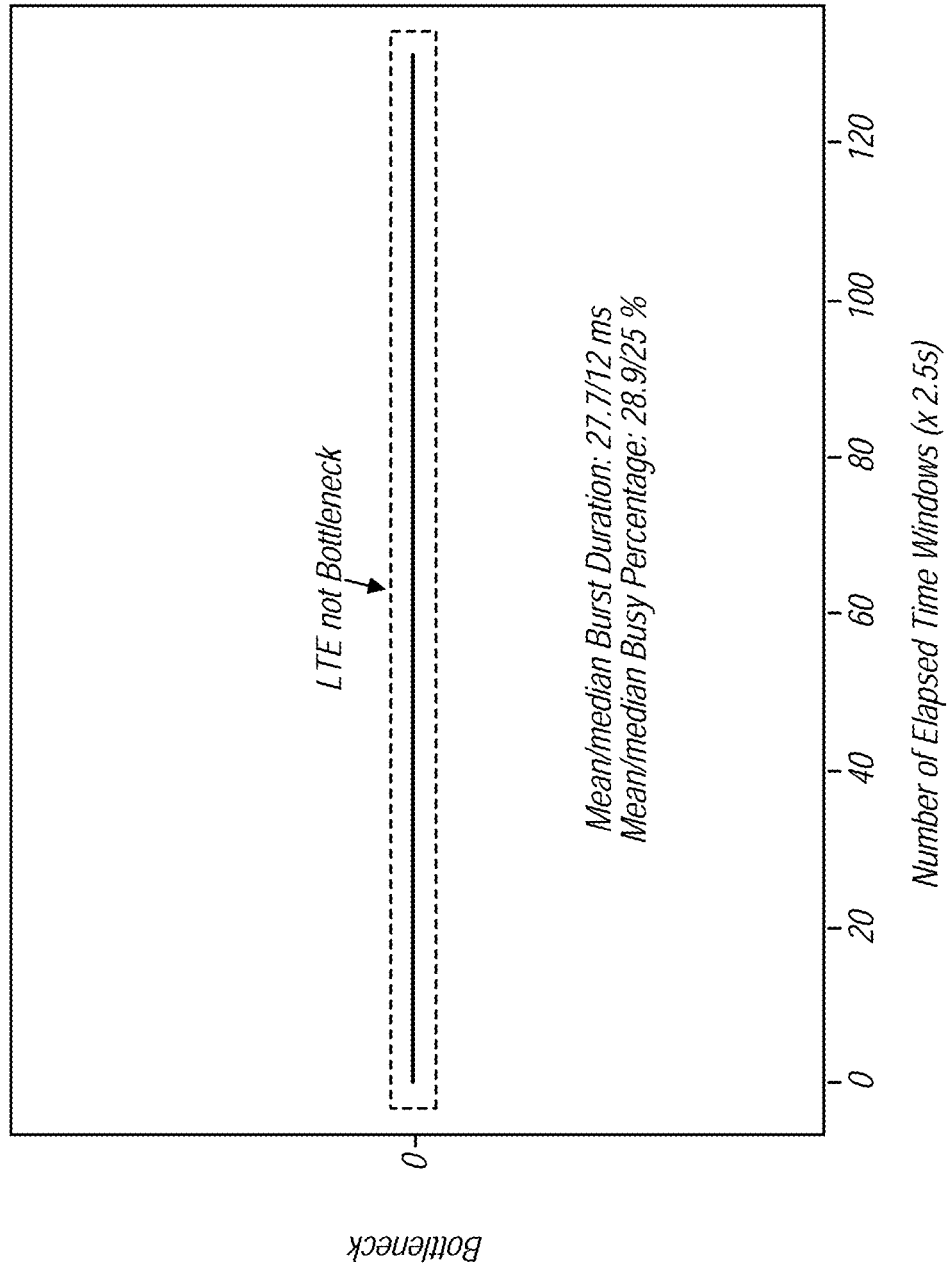
FIG. 17 is a graph illustrating determination of "no bottleneck" in accordance with aspects described herein.

FIG. 17 shows an example of the determination of the absence of a bottleneck by the method described herein. The graph of FIG. 17 represents the results of an experiment involving downlink video streaming to a UE at an average rate of 20.3 Mbps, a rate much lower than the RAT throughput. There was no contention from other UEs. As indicated by the graph, the method determined a mean burst duration of 27.7 ms and a median burst duration of 12 ms. The method determined a mean busy percentage of 28.9% and a median busy duration of 25%. Accordingly, the method determined "no bottleneck" for the system under test.

Figure 18:
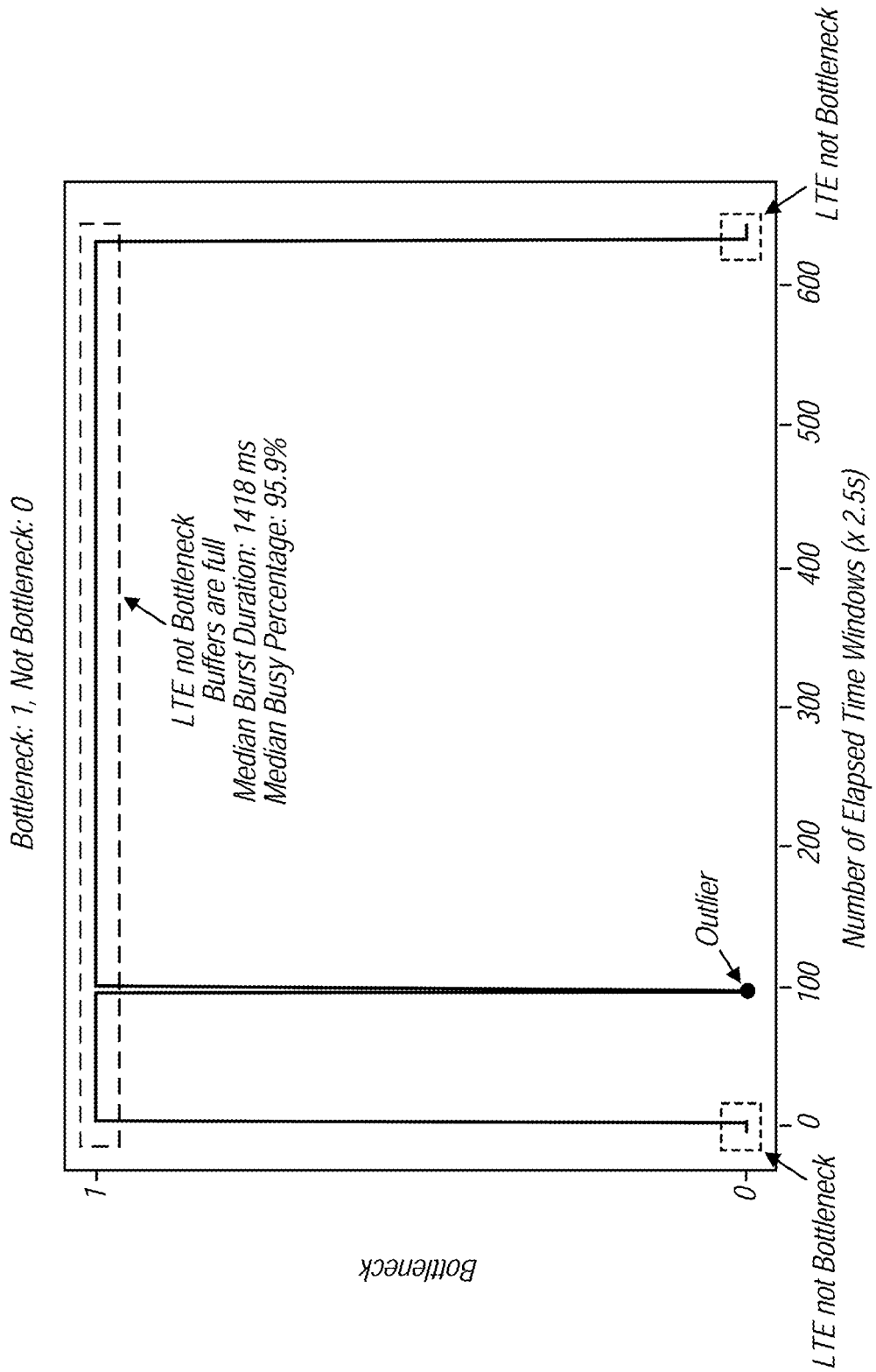
FIG. 18 is a graph illustrating determination of a bottleneck in accordance with aspects described herein.

FIG. 18 shows an example of the determination of a bottleneck by the method described herein. The graph of FIG. 18 represents the results of an experiment under the same conditions as those of FIG. 17, (a downlink video streaming to a UE at an average rate of 20.3 Mbps, a rate much lower than the RAT throughput), with the addition of contention by 11 other UEs. As indicated by the graph, the method determined a median burst duration of 1418 ms and a median busy duration of 95.9%. Through the use of a moving average calculation such as that described with reference to FIG. 11, the method determined a bottleneck for the system under test in spite of the outlier at x=100.

FIG. 19 shows an example of the determination of the absence of a bottleneck by the method described herein. The graph of FIG. 19 represents the results of an experiment involving downlink video streaming to a UE at an average rate of 1.1 Mbps, a rate much lower than the RAT throughput. There was no contention from other UEs. As indicated by the graph, the method determined a mean and median burst duration of 8 ms and a median busy duration of 20%. Accordingly, the method determined "no bottleneck" for the system under test.

Figure 20B:
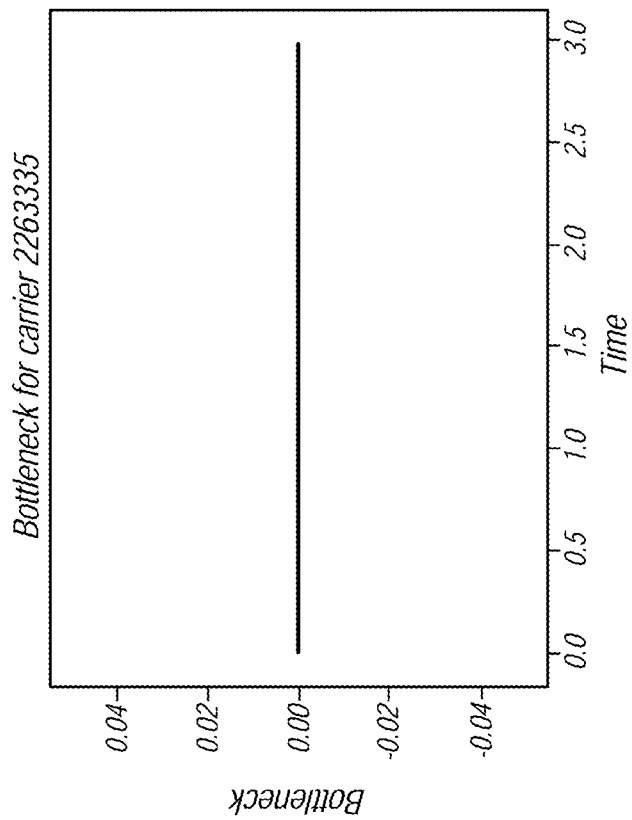
FIGS. 20A and 20B illustrate an example where the method successfully determines that there is not a bottleneck.
Figure 20A:
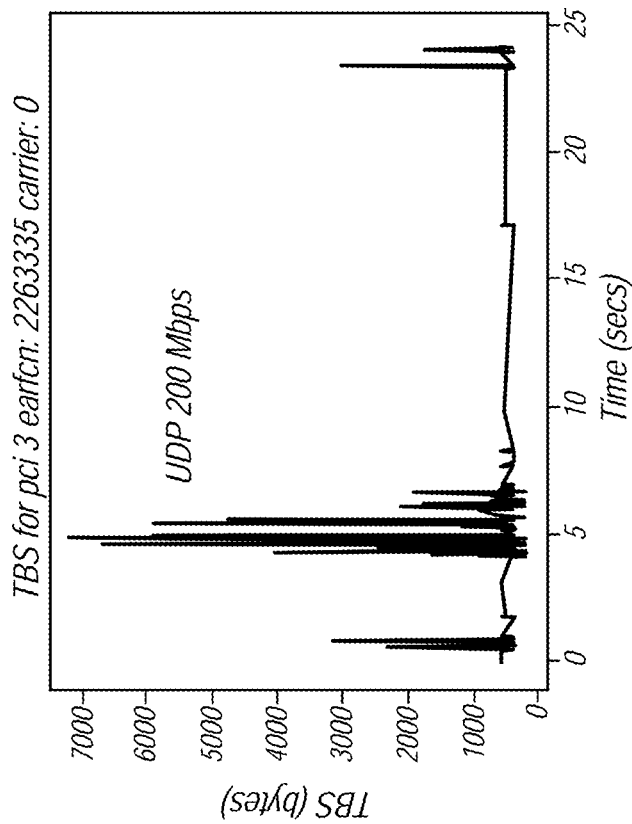

FIG. 20A is a graph illustrating the TBS over time for a UE for E-UTRA Absolute Radio Frequency Channel Number (EARFCN) 2263335. As shown, the TBS spikes upward in the 4-6 second range of the graph, but this is not sufficient to indicate a bottleneck, and as shown in FIG. 20B the method correctly identifies this situation as "not-bottleneck".

Figure 21B:
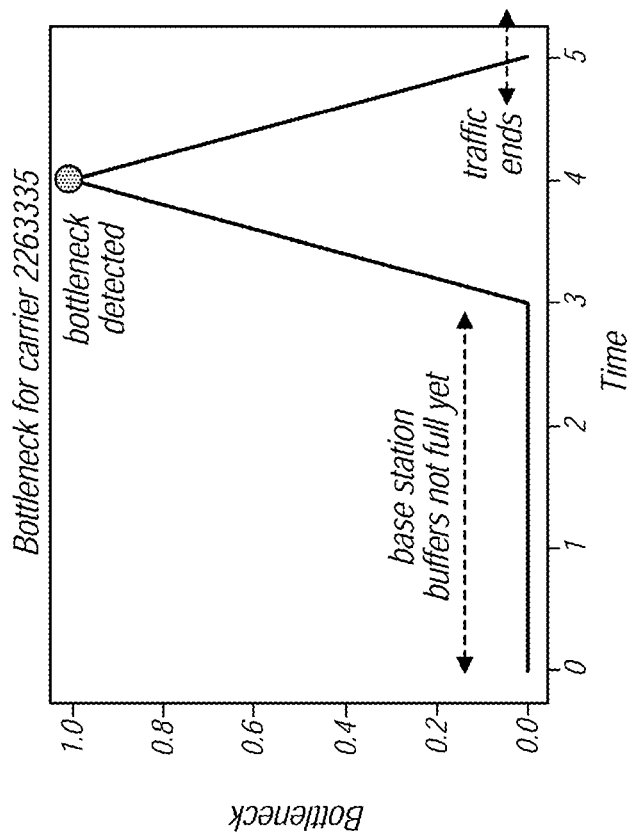
FIGS. 21A and 21B illustrate an example where the method successfully identifies a bottleneck.
Figure 21A:
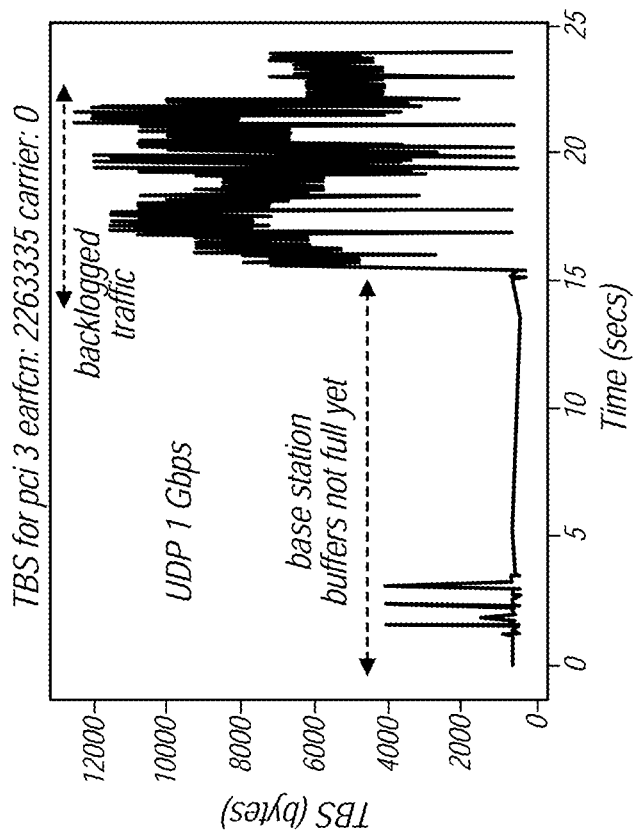

FIG. 21A is a graph illustrating the TBS over time for a UE for E-UTRA Absolute Radio Frequency Channel Number (EARFCN) 2263335. As shown, the TBS increases upward in the 2-4 second range of the graph, but this is not sufficient to indicate a bottleneck at this time, as the base station buffers are not yet full. The TBS spikes upward in the 15-24 second range of FIG. 21A, and as shown in FIG. 21B the method correctly identifies this situation as a "bottleneck".

Figure 22B:
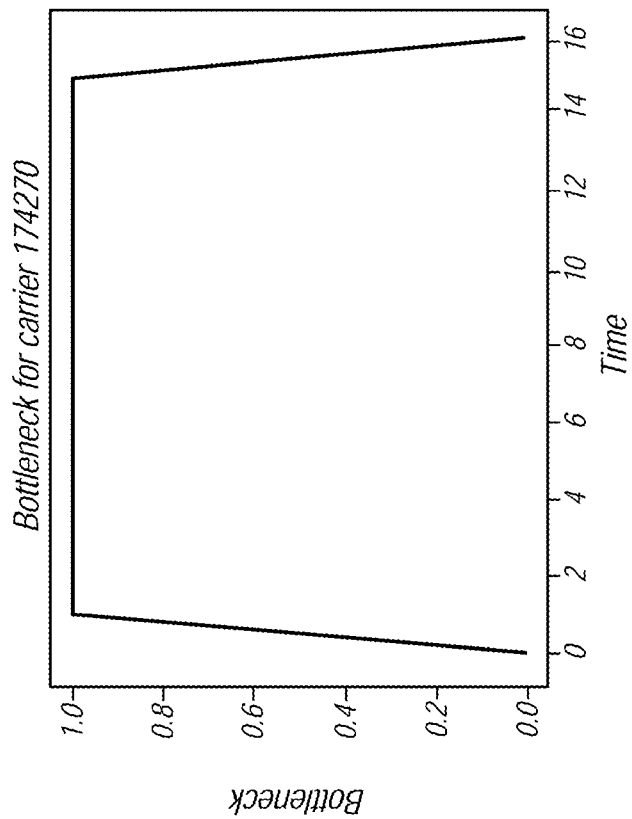
FIGS. 22A and 22B illustrate an example where the method successfully identifies a bottleneck.
Figure 22A:
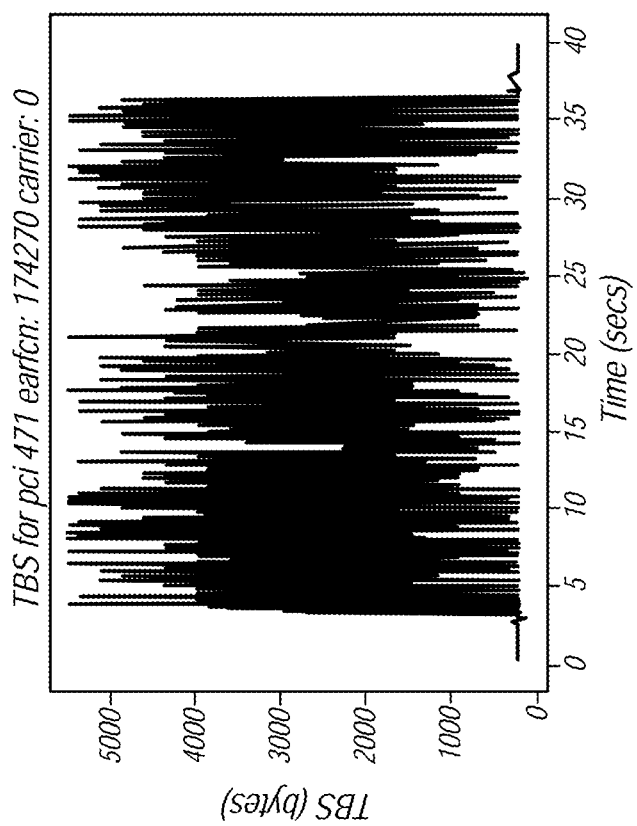

FIG. 22A is a graph illustrating the TBS over time for a UE for E-UTRA Absolute Radio Frequency Channel Number (EARFCN) 174270, where the UE is doing a high data rate FTP (File Transfer Protocol) operation. As shown, the TBS is very large from time 3-36 seconds of the graph, and as shown in FIG. 22B the method correctly identifies this situation as a "bottleneck".

Figure 23B:
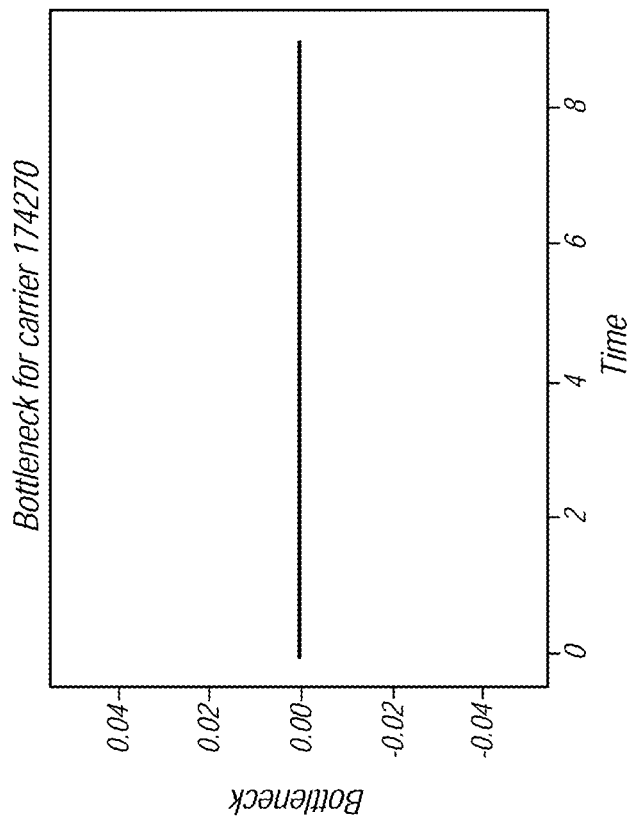
FIGS. 23A and 23B illustrate an example where the method successfully determines that there is not a bottleneck.
Figure 23A:
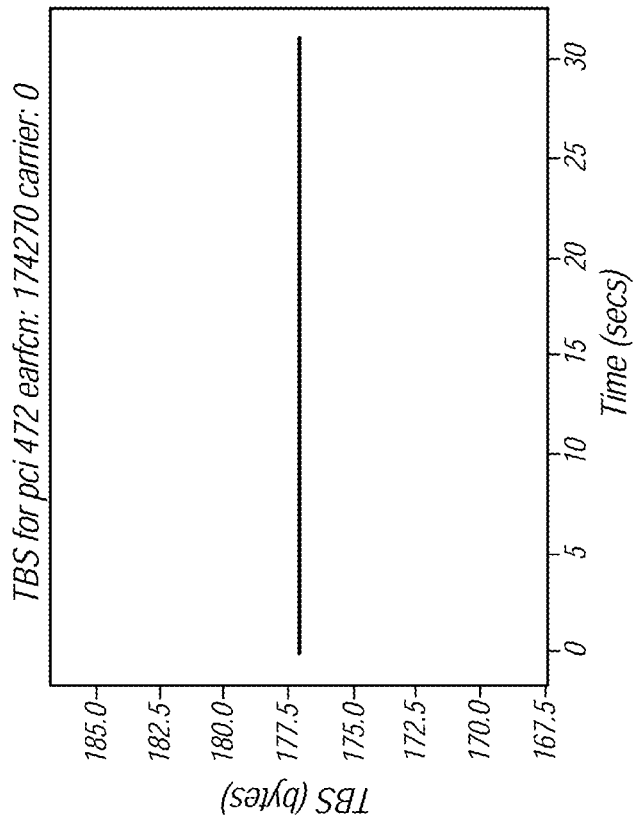

FIG. 23A is a graph illustrating the TBS over time for a UE for E-UTRA Absolute Radio Frequency Channel Number (EARFCN) 174270, where the UE is doing a low data rate ping operation. As shown, the TBS is quite steady and relatively low, and as shown in FIG. 23B the method correctly identifies this situation as a "not-bottleneck".

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the aspects above have been described in considerable detail, numerous variations and modifications will become apparent to those skilled in the art once the above disclosure is fully appreciated. It is intended that the following claims be interpreted to embrace all such variations and modifications.

The invention claimed is:

1. A user equipment (UE), comprising:
at least one antenna;
a radio operably coupled to the at least one antenna for communicating with a cellular network;
a memory coupled to the radio; and
a processor operably coupled to the memory and the radio;
wherein the UE is configured to:
receive network traffic from the cellular network during a series of transmission slots;
identify states of respective ones of the transmission slots based at least in part on a transport block size of each of the respective slots;
determine characteristics of a burst of network traffic in the received network traffic based on the identified states of the transmission slots; and
determine that the cellular network is experiencing a bottleneck based at least in part on the characteristics of the burst of network traffic.

2. The UE of claim 1,
wherein the determined characteristics comprise one or more of:
a duration of the burst of network traffic; or
a busy estimation of the burst of network traffic.

3. The UE of claim 2,
wherein the UE is configured to identify active and busy states of respective ones of the transmission slots in the burst based at least in part on the transport block size of each of the respective slots;
wherein the UE is configured to determine the busy estimation of the burst of network traffic based on a relative number of active and busy states in the burst; and
wherein the UE is configured to determine that the cellular network is experiencing a bottleneck based at least in part on the busy estimation.

4. The UE of claim 2,
wherein the UE is configured to identify a first active and last active transmission slot in the burst to determine the duration of the burst; and
wherein the UE is configured to determine that the cellular network is experiencing a bottleneck based at least in part on the duration of the burst.

5. The UE of claim 1,
wherein the UE is configured to identify the states of respective ones of the transmission slots based at least in part on the transport block size of the respective transmission slot relative to a maximum transport block size.

6. The UE of claim 5,
wherein the UE is configured to:
identify one or more slots in the burst as an active slot by determining that the transport block size of the slot relative to the maximum transport block size is greater than a threshold; and
determine that the cellular network is experiencing a bottleneck based at least in part on a percentage of slots in the burst of network traffic that are determined to be active.

7. The UE of claim 5,
wherein the UE is configured to:
identify one or more slots in the burst as an active slot by determining that the transport block size of the slot relative to the maximum transport block size is greater than a threshold;
identify a slot in the burst as a last active slot by determining that the transport block size of the slot relative to the maximum transport block size is lower than a threshold;
determine a duration of the burst as a time interval starting with a beginning active slot and ending with the last active slot; and
determine that the cellular network is experiencing a bottleneck based at least in part on the determined duration of the burst of network traffic.

8. The UE of claim 1,
wherein the UE is configured to determine an average of the characteristics over a plurality of bursts; and
wherein the UE is further configured to determine whether the cellular network is experiencing a bottleneck based at least in part on the average of the characteristics over the plurality of bursts.

9. The UE of claim 1,
wherein the UE is configured to determine a duration for each of a plurality of bursts;
wherein the UE is configured to compute an average burst duration based on the durations of each of the plurality of bursts; and
wherein the UE is configured to determine that the cellular network is experiencing a bottleneck based at least in part on a determination that the average burst duration of the network traffic is greater than a burst-duration threshold.

10. The UE of claim 1,
wherein the UE receives the network traffic while operating on a first radio access technology (RAT); and
wherein the UE is further configured to transition to a second RAT in response to determining that that the cellular network is experiencing a bottleneck.

11. An apparatus, comprising:
a memory; and
a processor in communication with the memory and configured to:
in response to received network traffic from a cellular network during a series of transmission slots, analyze a transport block size of respective ones of a plurality of the transmission slots;
determine characteristics of a burst of network traffic based on the analysis of the transport block size of respective ones of a plurality of the transmission slots; and
determine whether the cellular network is experiencing a bottleneck based at least in part on the characteristics of the burst of network traffic.

12. The apparatus of claim 11,
wherein the determined characteristics comprise one or more of:
a duration of the burst of network traffic; or
a busy estimation of the burst of network traffic.

13. The apparatus of claim 11,
wherein the processor is configured to analyze the transport block size by determining whether the transport block size of each of the respective slots relative to a maximum transport block size is greater than or less than a threshold.

14. The apparatus of claim 11,
wherein the processor is configured to identify states of respective ones of the plurality of the transmission slots based at least in part on the analysis of the transport block size; and
wherein the identified states are used in determining the characteristics of the burst of network traffic.

15. The apparatus of claim 14,
wherein the processor is configured to identify one or more slots in the burst as an active slot by determining that the transport block size of the slot relative to a maximum transport block size is greater than a threshold; and
wherein the processor is configured to determine that the cellular network is experiencing a bottleneck based at least in part on a percentage of slots in the burst of network traffic that are determined to be active.

16. The apparatus of claim 15,
wherein the processor is configured to determine a duration of the burst of network traffic by determining a first active transmission slot of the burst and a last active transmission slot of the burst;
wherein the processor is configured to determine the first active transmission slot as a transmission slot having an active state immediately preceded by a transmission slot with no resource blocks allocated to the apparatus;
wherein the processor is configured to determine the last active transmission slot as a transmission slot having a nonzero percentage of resource blocks containing data for the apparatus that is less than a threshold; and
wherein the processor is configured to determine that the cellular network is experiencing a bottleneck based at least in part on the determined duration of the burst of network traffic.

17. A method for operating a user equipment (UE) in a cellular network, the method comprising:
receiving network traffic from the cellular network during a series of transmission slots;
analyzing a transport block size of a plurality of transmission slots;
determining characteristics of a burst of network traffic from the received network traffic based on said analyzing the transport block size of the plurality of transmission slots; and
determining that the cellular network is experiencing a bottleneck based at least in part on the characteristics of the burst of network traffic.

18. The method of claim 17,
wherein said analyzing the transport block size comprises determining whether the transport block size of each of the respective slots relative to a maximum transport block size is greater than or less than a threshold;
wherein determining the characteristics comprises:
identifying states of respective ones of the transmission slots based on said analyzing; and
determining the characteristics of a burst of network traffic based on the identified states of the transmission slots.

19. The method of claim 18,
wherein identifying the states comprises identifying one or more slots in the burst as an active slot by determining that the transport block size of the slot relative to a maximum transport block size is greater than a threshold; and
wherein determining whether the cellular network is experiencing a bottleneck comprises determine that the cellular network is experiencing a bottleneck based at least in part on a percentage of slots in the burst of network traffic that are determined to be active.

20. The method of claim 18,
wherein identifying the states comprises identifying a first active transmission slot of the burst and a last active transmission slot of the burst in order to determine a duration of the burst; and
wherein determining that the cellular network is experiencing a bottleneck is based at least in part on the duration of the burst of network traffic being greater than a threshold.

* * * * *